US011933020B2

(12) United States Patent
Tanaka et al.

(10) Patent No.: US 11,933,020 B2
(45) Date of Patent: Mar. 19, 2024

(54) CONSTRUCTION MACHINE

(71) Applicant: KOBELCO CONSTRUCTION MACHINERY CO., LTD., Hiroshima (JP)

(72) Inventors: Kiyokazu Tanaka, Tokyo (JP); Reona Takamura, Tokyo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 843 days.

(21) Appl. No.: 16/976,345

(22) PCT Filed: Mar. 18, 2019

(86) PCT No.: PCT/JP2019/011030
§ 371 (c)(1),
(2) Date: Aug. 27, 2020

(87) PCT Pub. No.: WO2019/181817
PCT Pub. Date: Sep. 26, 2019

(65) Prior Publication Data

US 2021/0040710 A1 Feb. 11, 2021

(30) Foreign Application Priority Data

Mar. 19, 2018 (JP) ................................. 2018-051029

(51) Int. Cl.
*E02F 9/20* (2006.01)
*E02F 9/26* (2006.01)
(Continued)

(52) U.S. Cl.
CPC ................. *E02F 9/20* (2013.01); *G05G 1/04* (2013.01); *E02F 9/26* (2013.01); *G05G 5/03* (2013.01)

(58) Field of Classification Search
CPC ... E02F 9/26; E02F 9/16; E02F 9/2004; E02F 3/32; B60K 35/00; B60K 2370/1529;
(Continued)

(56) References Cited

U.S. PATENT DOCUMENTS

2012/0092173 A1 4/2012 Sanchez
2013/0066527 A1 3/2013 Mizuochi et al.
(Continued)

FOREIGN PATENT DOCUMENTS

CN 107532409 A 1/2018
EP 2 444 919 A1 4/2012
(Continued)

OTHER PUBLICATIONS

Combined Chinese Office Action and Search Report dated Sep. 27, 2021 in Chinese Patent Application No. 201980016110.8 (with English summary).
(Continued)

*Primary Examiner* — Faris S Almatrahi
*Assistant Examiner* — Andrew J Cromer
(74) *Attorney, Agent, or Firm* — Oblon, McClelland, Maier & Neustadt, L.L.P.

(57) ABSTRACT

A storage part of a construction machine stores an operation target which is set as a target of an operation of the construction machine for moving a specific portion of the construction machine to a target position set as a destination to which the specific portion moves. A calculation part calculates an index value which serves as an index indicating a deviation between the operation target and an actual state of the construction machine. A control device is configured to cause a vibration applying device to perform a first vibration applying operation when the index value satisfies a predetermined first condition, and to cause the vibration applying device to perform a second vibration applying
(Continued)

operation when the index value satisfies a predetermined second condition different from the first condition.

15 Claims, 16 Drawing Sheets

(51) Int. Cl.
*G05G 1/04* (2006.01)
*G05G 5/03* (2008.04)

(58) Field of Classification Search
CPC ................ B60K 2370/162; B60R 1/00; B60R 2300/205; B60R 2300/302; B60R 2300/70
See application file for complete search history.

(56) References Cited

U.S. PATENT DOCUMENTS

2014/0132405 A1* 5/2014 Kiefer ................... B60W 50/14 340/438
2015/0292895 A1* 10/2015 Lewis ................ G01C 21/3461 701/538
2016/0176338 A1 6/2016 Husted et al.
2016/0237654 A1 8/2016 Arimatsu et al.
2017/0073935 A1* 3/2017 Friend ..................... E02F 9/265
2018/0074178 A1 3/2018 Cook et al.

FOREIGN PATENT DOCUMENTS

| | | | |
|---|---|---|---|
| EP | 2 578 757 | A1 | 4/2013 |
| JP | 10-157983 | A | 6/1998 |
| JP | 10-159122 | A | 6/1998 |
| JP | 11-210015 | A | 8/1999 |
| JP | 2003-184131 | A | 7/2003 |
| JP | 2005-105582 | A | 4/2005 |
| JP | 2007-9432 | A | 1/2007 |
| JP | 2009-197438 | A | 9/2009 |
| JP | 2016-94106 | A | 5/2016 |
| KR | 2003-0027762 | A | 4/2003 |
| WO | WO 2015/173935 | A1 | 11/2015 |

OTHER PUBLICATIONS

Extended European Search Report dated Apr. 1, 2021 in European Patent Application No. 19770836.5, 7 pages.
International Search Report dated Jun. 11, 2019 in PCT/JP2019/011030 filed Mar. 18, 2019, 2 pages.

* cited by examiner

CONSTRUCTION MACHINE

TECHNICAL FIELD

The present invention relates to a construction machine such as a hydraulic excavator.

BACKGROUND ART

A work of a construction machine such as a hydraulic excavator is performed when an operator in an operation room operates an operation lever or the like. It is preferable to move an attachment of the construction machine along a target track at the time of performing the work because the work can be efficiently performed.

As a method for moving the attachment along the target track, there has been known a method using a mechanism which teaches operation amounts of operation levers for operating a boom, an arm, an attachment and the like. In such a construction machine, the mechanism teaches an operation amount of the operation lever such that the attachment moves along a target track (for example, see Patent Literature 1 and Patent Literature 2).

The construction machine disclosed in Patent Literature 1 includes a setting unit for setting an operation target surface for an attachment or the like, and an electromagnetic actuator which teaches an operator an operation by applying an assist force, corresponding to a degree of approach to the operation target surface and an operation direction of the attachment, to the operation lever such that the operation is performed along the operation target surface when the attachment approaches the operation target surface by an operation of the operation lever.

Teaching of the operation is performed such that when the operator operates the attachment or the like using the operation lever and the attachment is about to move away from the operation target surface, the assist force is applied to the operation lever by the electromagnetic actuator so as to make the attachment approach the operation target surface.

The construction machine disclosed in Patent Literature 2 has: a vehicle state detection part which detects information relating to a current position and the posture of the construction machine; a storage part which stores position information relating to a target surface of an operation target; a processing part which acquires target slewing information indicating a slewing amount of an upper slewing body necessary for allowing a cutting edge of the attachment to opposedly face a target surface based on information including a direction of the cutting edge of the attachment, information including a direction orthogonal to the target surface and the like, and displays an image corresponding to the target slewing information relating to a display device; and a sound generation device.

The processing part displays the position of the cutting edge of the attachment with respect to the target surface on the display device, and teaches an operation by shortening an interval of sound generated from the sound generation device as a cutting edge vector of the attachment and the target surface become more parallel to each other.

However, in Patent Literature 1, the operation lever is directly moved by an assist force of the electrically-operated actuator and hence, the operator may feel cumbersome. Further, in Patent Literature 2, when a line of sight of the operator moves to the display device from a distal end of the attachment, the line of sight to the distal end of the attachment is interrupted, and such a situation is not desirable.

Further, there may be a case where it is difficult for the operator to hear a sound generated by the sound generation device due to noises at a construction site. Accordingly, there is a room for improvement in the operation teaching means described in Patent Literatures 1 and 2.

CITATION LIST

Patent Literature

Patent Literature 1: JP 2007-009432 A
Patent Literature 2: WO 2015/173935 Pamphlet

SUMMARY OF INVENTION

It is an object of the present invention to provide a construction machine which can certainly teach an operator an operation without interrupting a line of sight of the operator, without making it difficult for the operator to hear a teaching sound, and with decreasing cumbersomeness in operation of an operation lever.

Provided is a construction machine including: a lower travelling body; an upper slewing body mounted on the lower travelling body so as to be slewable; a working device rotatably connected to the upper slewing body; an attachment connected to a distal end of the working device; an operation part which receives an operation by an operator for operating at least one of the lower travelling body, the upper slewing body, the working device, and the attachment; a vibration applying device which applies a vibration to a target portion that is at least a part of a portion which is brought into contact with a body of the operator who operates the operation part; a storage part which stores an operation target set as a target of an operation of the construction machine for moving a specific portion of the construction machine to a target position which is set as a destination to which the specific portion of the construction machine moves; a calculation part which calculates an index value which serves as an index indicating a deviation between the operation target and an actual state of the construction machine; and a control device which controls an operation of the vibration applying device. The vibration applying device is configured to perform a first vibration applying operation for applying a vibration having a first vibration pattern to the target portion, and a second vibration applying operation for applying a vibration having a second vibration pattern different from the first vibration pattern to the target portion. The control device is configured to cause the vibration applying device to perform the first vibration applying operation when the index value calculated by the calculation part satisfies a predetermined first condition, and to cause the vibration applying device to perform the second vibration applying operation when the index value calculated by the calculation part satisfies a predetermined second condition different from the first condition.

DESCRIPTION OF EMBODIMENTS

Figure 1:
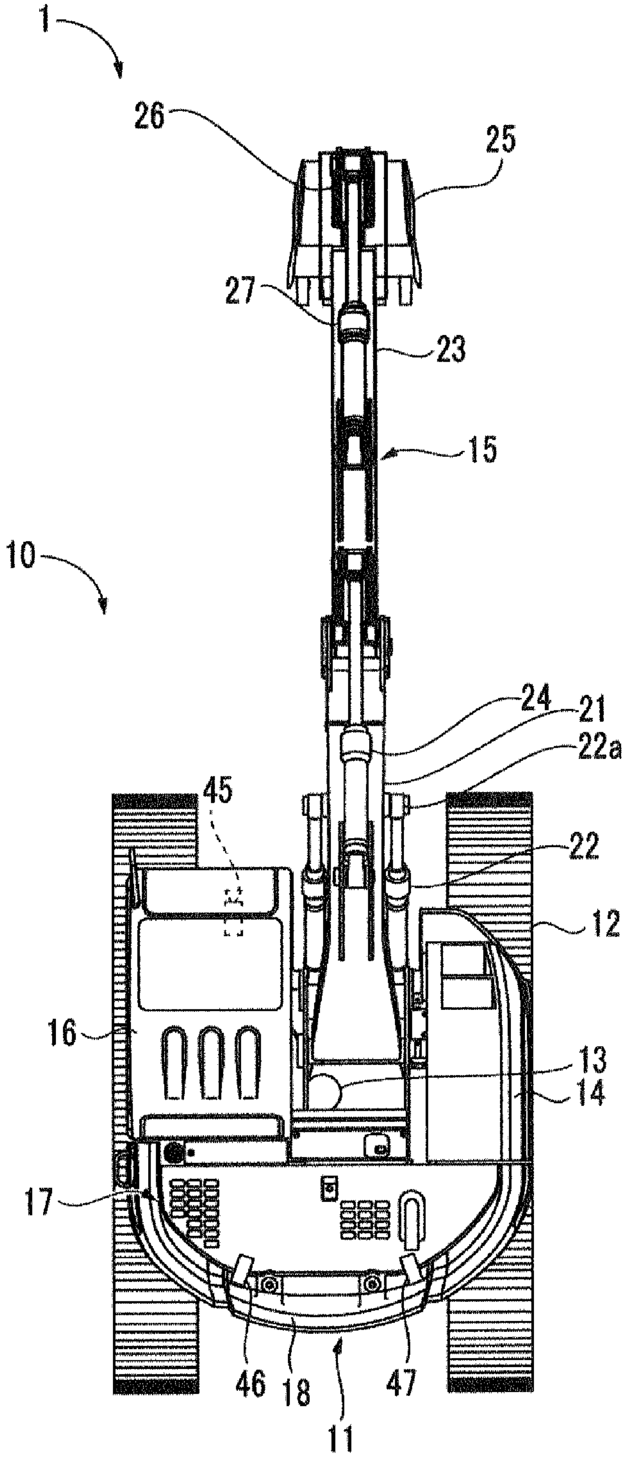
FIG. 1 is a plan view showing a construction machine according to an embodiment of the present invention.
Figure 2:
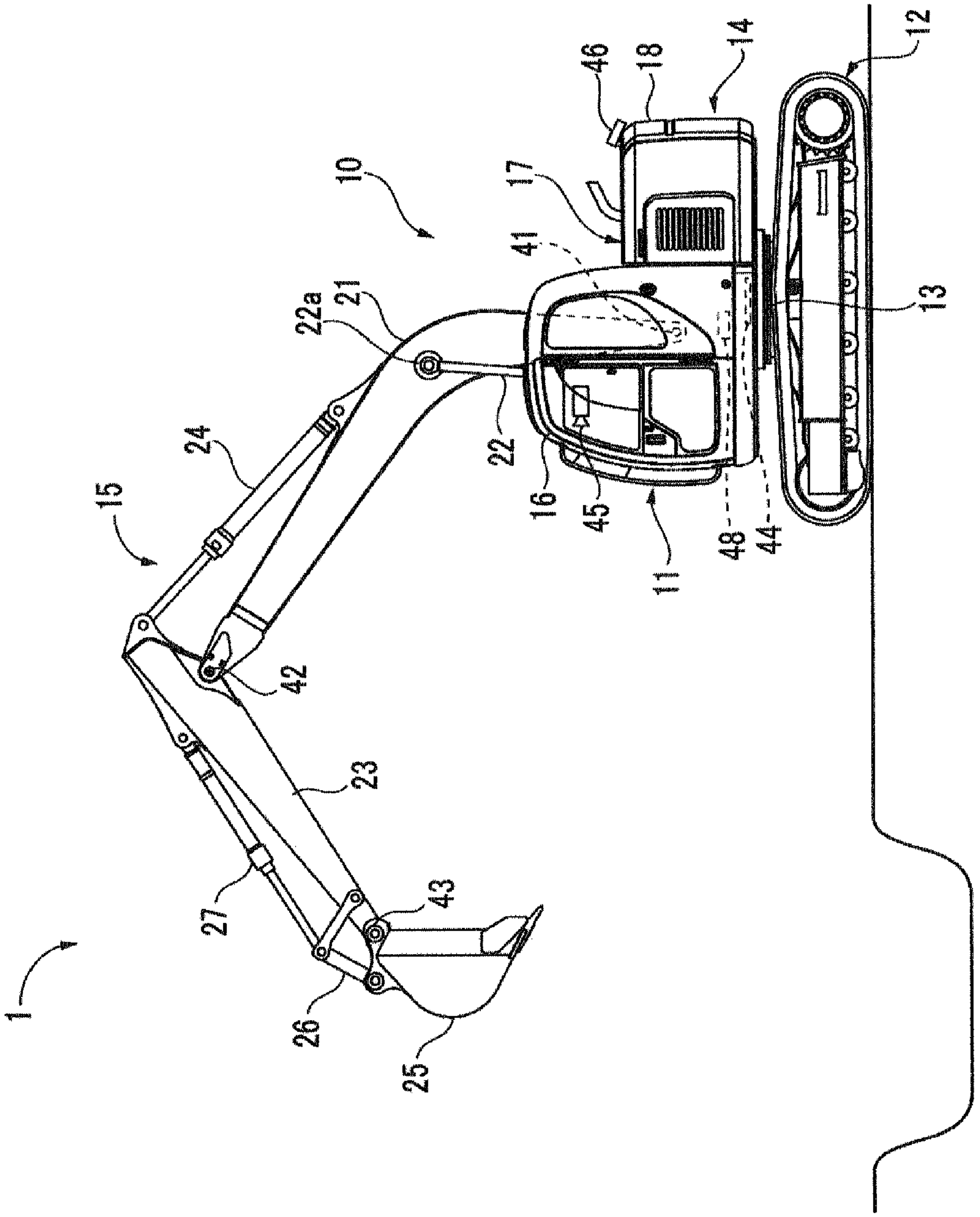
FIG. 2 is a side view showing the construction machine according to the embodiment.

A construction machine 10 according to an embodiment of the present invention is described in detail with reference to drawings. As shown in FIGS. 1 and 2, the construction machine 10 is a hydraulic excavator. The construction machine 10 includes a lower travelling body 12, an upper slewing body 14 mounted on the lower travelling body 12 so as to be slewable by way of a slewing shaft 13, a working device 15 mounted on the upper slewing body 14, and an attachment 25. In the present embodiment, the working device 15 includes a boom 21 and an arm 23. In the present embodiment, the attachment 25 is a bucket. However, the attachment 25 is not limited to the bucket, and may be a grapple, a hydraulic crusher (crusher), a breaker, a fork or the like, for example.

The upper slewing body 14 has a slewing frame connected to the lower travelling body 12, an operation room (cab) 16 mounted on the slewing frame, and a machine room 17 mounted on the slewing frame. The operation room 16 is arranged at a front portion of the slewing frame which is displaced on one side in a lateral direction. The machine room 17 is arranged at a rear portion of the slewing frame. In the machine room 17, an engine and a counterweight 18 are disposed.

The construction machine 10 further includes a plurality of actuators for moving the lower travelling body 12, the upper slewing body 14, the working device 15, and the bucket 25. The plurality of actuators include a boom cylinder 22, an arm cylinder 24, a bucket cylinder 27, a slewing motor 28 (see FIG. 5), and a traveling drive device not shown in the drawing.

The boom cylinder 22 is an actuator for rotating the boom 21 with respect to the upper slewing body 14. A proximal end portion of the boom cylinder 22 is rotatably supported with respect to the upper slewing body 14. A distal end portion of the boom cylinder 22 is rotatably connected to the boom 21 by way of a pin 22*a*. The arm 23 is connected to a distal end portion of the boom 21.

The arm cylinder 24 is an actuator for rotating the arm 23 with respect to the boom 21. A proximal end portion and a distal end portion of the arm cylinder 24 are rotatably supported on the boom 21 and the arm 23 respectively. The bucket 25 is connected to a distal end portion of the arm 23.

The bucket cylinder 27 is an actuator for rotating the bucket 25 with respect to the arm 23. A proximal end portion of the bucket cylinder 27 is rotatably supported on the arm 23. A distal end portion of the bucket cylinder 27 is rotatably supported on the arm 23 and the bucket 25 by way of a link portion 26 such that the bucket 25 which is the attachment 25 is rotated by the bucket cylinder 27 with respect to the arm 23.

The construction machine 10 further includes a first angle sensor 41, a second angle sensor 42, a third angle sensor 43, a fourth angle sensor 44, a plurality of external environment state detection parts, and a plurality of load measurement parts.

The first angle sensor 41 is mounted on a rotating shaft portion of the boom 21 which is rotatably supported on the upper slewing body 14, and measures a rotation angle of the boom 21 with respect to the upper slewing body 14. The second angle sensor 42 is mounted on a rotating portion of the arm 23 which is rotatably supported on the boom 21, and measures a rotation angle of the arm 23 with respect to the boom 21.

The third angle sensor 43 is mounted on the bucket (attachment) 25 which is rotatably supported on the arm 23, and measures a rotation angle of the bucket 25 with respect to the arm 23. The fourth angle sensor 44 is mounted on the slewing shaft 13 of the upper slewing body 14 which is mounted on the lower travelling body 12 so as to be slewable, and measures a rotation angle of the upper slewing body 14 with respect to the lower travelling body 12. The fourth angle sensor 44 can detect a slewing amount (slewing angle) of the upper slewing body 14. Postures of the bucket (attachment) 25 and the working device 15 are detected by the first to fourth angle sensors 41, 42, 43 and 44.

Each of the first to fourth angle sensors 41 to 44 is formed of a rotary encoder, for example. Each of the first to fourth angle sensors 41 to 44 detects an angle of a measurement target at a fixed cycle, and constantly transmits detected angle data to the control device.

The plurality of external environment state detection parts are devices each detecting an external environment state which is a state around the construction machine 10. The plurality of external environment state detection parts include a three-dimensional scanner 45, a plurality of area sensors, and an inclination sensor 48.

The three-dimensional scanner 45 is a device which can detect unevenness of an object and can acquire 3D data of the object. In this embodiment, the three-dimensional scanner 45 is disposed in the operation room 16, has a field of view which expands in front of the construction machine 10, and detects an external environment state in the field of view. The three-dimensional scanner 45 transmits the acquired 3D data to the control device.

The plurality of area sensors include: a first area sensor 46 configured to detect a first peripheral object when the first peripheral object is positioned within a first area around the construction machine 10; and a second area sensor 47 configured to detect a second peripheral object when the second peripheral object is positioned within a second area around the construction machine 10. As shown in FIGS. 1 and 2, in the present embodiment, the first area and the second area are areas which differ from each other behind the construction machine 10. The first area sensor 46 and the second area sensor 47 are respectively formed of an infrared sensor or the like, for example. When each of the first and second area sensors detects that a peripheral object is positioned within a measurement target area, the area sensor transmits the detected data to the control device.

Each of the first peripheral object and the second peripheral object may include various objects such as a moving object and a stationary object other than the construction machine 10. Specifically, each of the first peripheral object and the second peripheral object may be a vehicle, a building, a surface portion of the ground such as sand or asphalt, for example.

The inclination sensor 48 measures an inclination of the construction machine 10 with respect to a horizontal direction or a horizontal plane. The inclination sensor 48 detects an inclination angle of the construction machine 10 with respect to the horizontal direction or the horizontal plane at a fixed cycle, and constantly transmits the detected inclination angle data to the control device.

Figure 5:
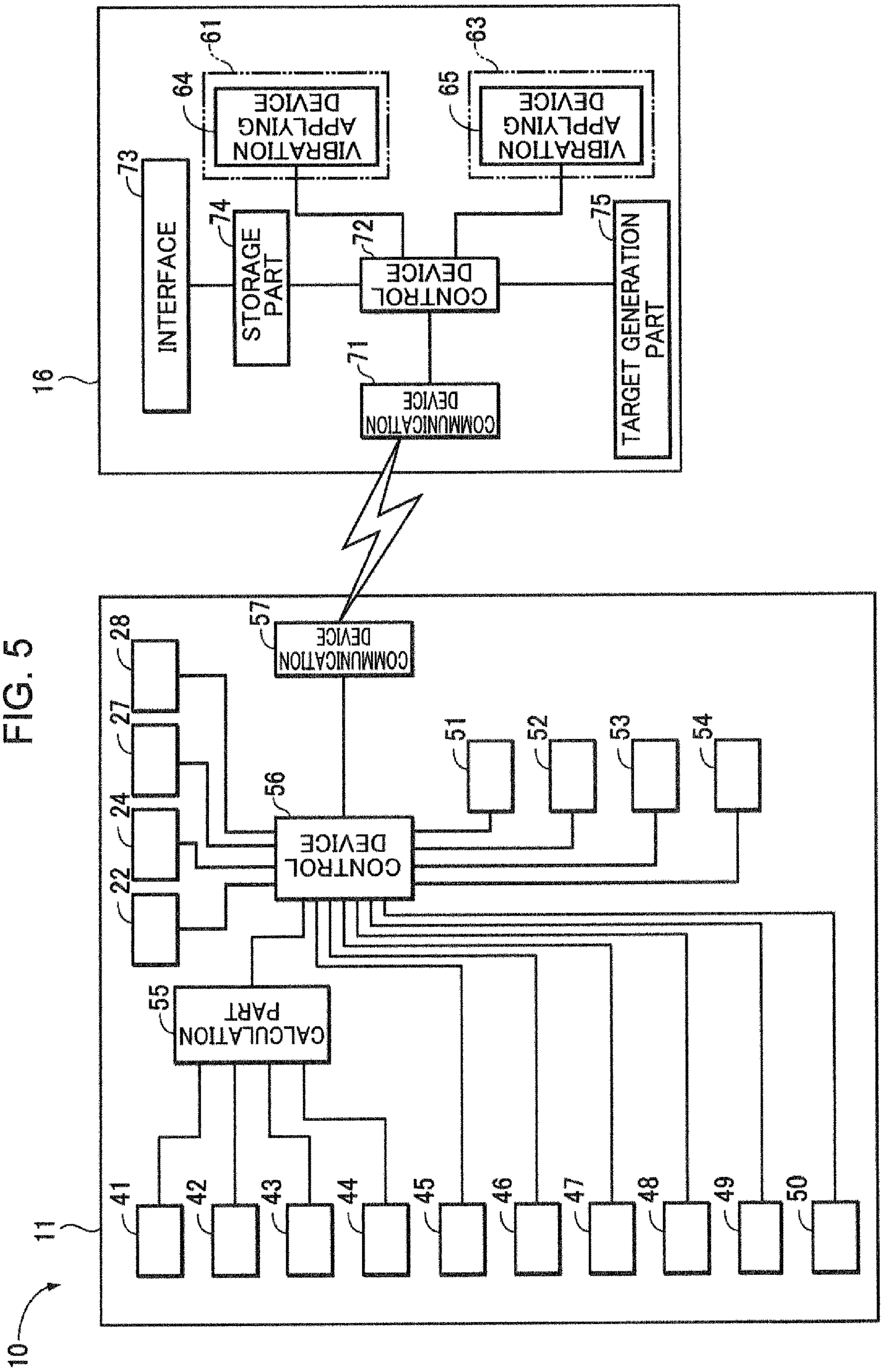
FIG. 5 is a block diagram showing a configuration of the construction machine according to the embodiment.

As shown in FIG. 5, the plurality of load measurement parts include: a load measurement part 51 which measures a magnitude of a load (holding pressure) applied to the boom cylinder 22; a load measurement part 52 which measures a magnitude of a load (holding pressure) applied to the arm cylinder 24; and a load measurement part 53 which measures a magnitude of a load (holding pressure) applied to the bucket cylinder 27. The plurality of load measurement parts further include: a load measurement part not shown in the drawing which measures a magnitude of a load (holding pressure) applied to the traveling drive device which forms an actuator for driving the lower travelling body 12; and a load measurement part 54 which measures a magnitude of a load (holding pressure) applied to the slewing motor 28 which forms an actuator for slewing the upper slewing body 14. Each of the plurality of load measuring parts is formed of a pressure sensor, for example. The plurality of load measuring parts respectively measure loads applied to a measurement object at a fixed cycle, and constantly transmits the measured load data to the control device.

The plurality of external environment state detection parts are not limited to the three-dimensional scanner 45, the area sensors 46, 47, and the inclination sensor 48. The external environment state detection part may be other equipment which can measure an external environment state such as a distance measuring instrument or a camera besides the three-dimensional scanner, the area sensor, and the inclination sensor.

Each of the plurality of load measuring parts is not limited to the pressure sensor. It is sufficient for each of the plurality of load measuring parts to detect a magnitude of a load applied to the corresponding actuator, and each of the plurality of load measuring parts may be another measuring instrument such as a strain gauge.

The construction machine 10 further includes: operation parts each receiving an operation by an operator; contact parts each being a part of the construction machine 10, each of the contact parts being brought into contact with a body of an operator who operates the operation parts, each of the contact parts being a part other than the operation parts; and a plurality of vibration applying devices each applying vibration to a target portion which is at least a part of a portion which is brought into contact with the body of the operator who operates the operation parts. The target portion may be at least a portion of the operation parts, for example. The target portion may be at least a portion of the contact parts, for example.

Figure 3:
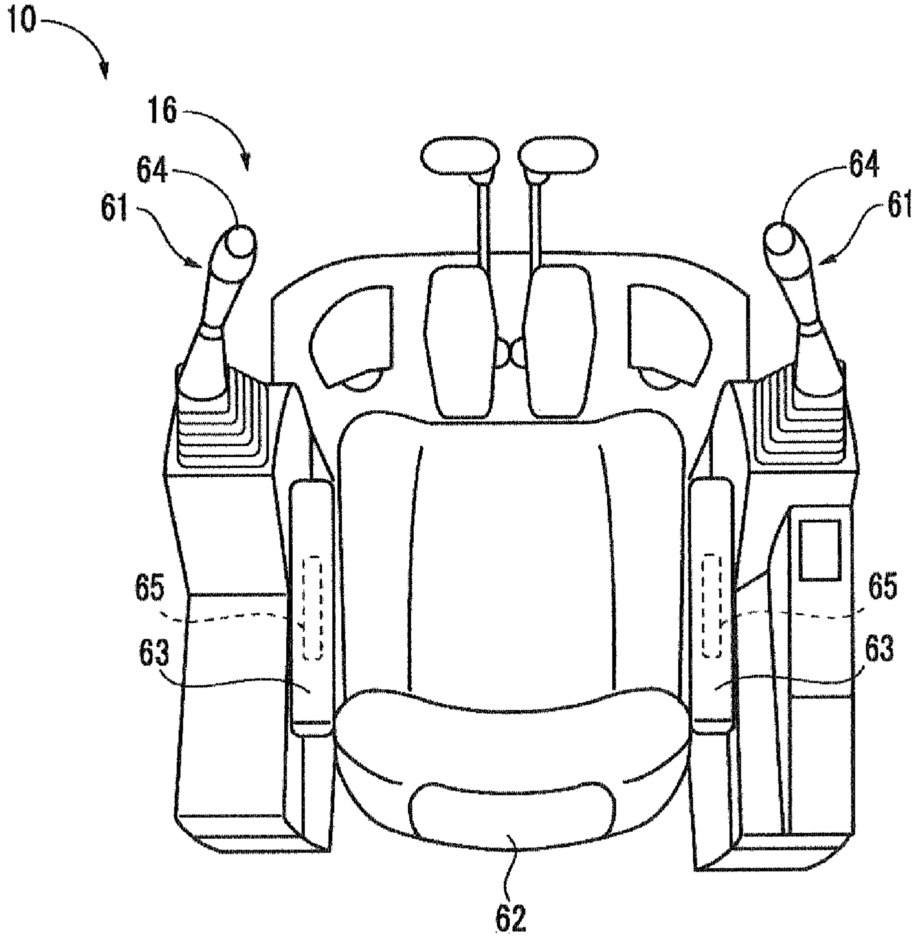
FIG. 3 is a perspective view showing an operation room of the construction machine according to the embodiment.

Specifically, as shown in FIG. 3, the operation parts include a pair of left and right operation levers 61 each receiving an operation by an operator. The contact parts include a seat 62 on which an operator sits, and a pair of left and right armrests 63 on which the operator places his or her arms. The pair of operation levers 61, the seat 62, the pair of armrests 63, and the plurality of vibration applying devices are disposed in the operation room 16.

The plurality of vibration applying devices include: a pair of vibration applying devices 64 provided to the pair of operation levers 61 respectively; and a pair of vibration applying devices 65 provided to the pair of armrests 63 respectively.

The pair of vibration applying devices 64 applies vibration to the pair of operation levers 61 respectively. The pair of vibration applying devices 64 is provided to the pair of operation levers and hence, alarm information is transmitted to the operator via the operation levers which the operator grasps with his/her hands with certainty. In the embodiment, the pair of vibration applying devices 64 is mounted on the operation levers 61 each being an example of the operation part, but the present invention is not limited to such a configuration, and the vibration applying device may be provided to other operation part such as an operation pedal or a handle not shown in the drawing.

The pair of vibration applying devices 65 applies vibration to the pair of armrests 63 respectively. The pair of vibration applying devices 65 is provided to the pair of armrests 63 and hence, the vibrations are transmitted to the operator via the arms of the operator, and it is possible to improve the perception of the operator to alarm information.

In this embodiment, the pair of armrests 63 is exemplified as the contact parts to which the vibration applying devices are provided respectively, but the contact parts are not limited to the pair of armrests 63. The vibration applying device may be provided to the seat 62 (including a seat cushion, a seat back, a footrest, a headrest) as the contact part, or on a floor.

Figure 4:
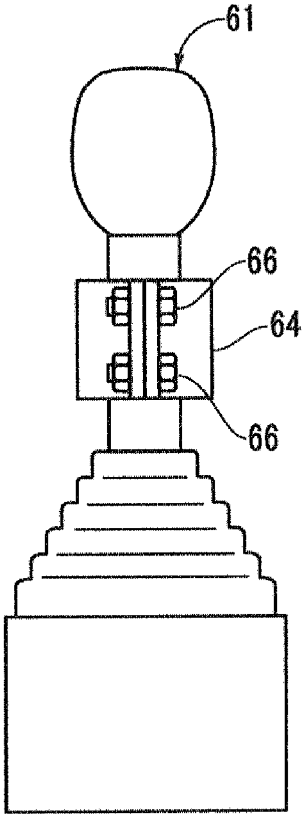
FIG. 4 is a front view showing an operation lever on which a detachable vibration applying device is mounted in the construction machine according to the embodiment.

As shown in FIG. 4, each of the pair of vibration applying devices 64 is detachably mounted on the operation lever 61. Specifically, each of the pair of vibration applying devices 64 is arranged so as to surround the corresponding operation lever 61, and is fastened by a fastening member 66. In the embodiment, the vibration applying device 64 is arranged on a vertically extending bar of the operation lever 61, but the present invention is not limited to such a configuration. The vibration applying device 64 may be mounted on a knob portion of the operation lever 61, or may be disposed at a proximal end portion of the bar of the operation lever 61. It is sufficient for the vibration applying device 64 that the vibration can be transmitted to the operator, therefore, a shape and a mounting mode of the vibration applying device 64 are not limited.

Next, a functional configuration of the construction machine 10 is described with reference to a block diagram shown in FIG. 5. As shown in FIG. 5, the construction machine 10 includes the operation room 16 and a main body 11 which is a part of the construction machine 10 other than the operation room 16. The main body 11 includes a calculation part 55, a control device 56, and a communication device 57. As shown in FIG. 3 and FIG. 5, the operation room 16 includes the operation parts which includes the pair of operation levers 61, the seat 62 and the pair of armrests 63. Besides these parts, the operation room 16 further includes a communication device 71, the control device 72, an interface 73, a storage part 74, a target generation part 75, and the vibration applying devices 64, 65. The calculation part 55, the control device 56, the control device 72, the storage part 74, and the target generation part 75 form a controller. The controller is formed of a computer, for example.

The calculation part 55 calculates coordinates of a specific portion of the construction machine 10 in a machine coordinate system based on angle information inputted from the first angle sensor 41, the second angle sensor 42, the third angle sensor 43 and the fourth angle sensor 44 respectively. In this embodiment, the specific portion is a distal end portion of the attachment 25. The calculation part 55 also calculates postures of the upper slewing body 14, the boom 21, the arm 23, and the attachment 25 in a machine coordinate system of the construction machine 10. The coordinate information and the posture information calculated by the calculation part 55 are inputted to the control device 56. The communication device 57 transmits information outputted from the control device 56 to the communication device 71 of the operation room 16.

To the control device 56, signals outputted from the external environment state detection part (three-dimensional scanner) 45, the external environment state detection parts (area sensors) 46, 47, the external environment state detection part (inclination sensor) 48, the load measurement parts 51, 52 and 53, the slewing motor load measurement part 54, the load measurement part of the traveling drive device are respectively inputted. Further, the control device 56 outputs signals for controlling the operations of the boom cylinder 22, the arm cylinder 24, the bucket cylinder 27, the slewing motor 28, and the traveling drive device respectively.

The communication device 71 disposed in the operation room 16 of the construction machine 10 mutually transmits the information with the communication device 57 of the main body 11. The information which the communication device 71 receives is inputted to the control device 72. The interface 73 is connected to the control device 72.

The storage part 74 stores an operation target set as a target of an operation of the construction machine 10 for moving the specific portion to a target position set as a destination to which the specific portion of the construction machine 10 moves. In this embodiment, the operation target includes at least one of a target track, a deceleration target timing, and a deceleration target slewing amount.

The target track is set as a target of a track drawn by the specific portion when the specific portion moves toward the target position.

The deceleration target timing is set as a target of a timing at which the upper slewing body 14 starts a deceleration operation in response to a slewing deceleration command operation given to the operation part, the slewing deceleration command operation being a operation for stopping a slewing operation of the upper slewing body 14.

The deceleration target slewing amount is set as a target of a slewing amount at which the upper slewing body 14 starts a deceleration operation in response to a slewing deceleration command operation given to the operation part, the slewing deceleration command operation being a operation for stopping a slewing operation of the upper slewing body 14.

Figure 8:
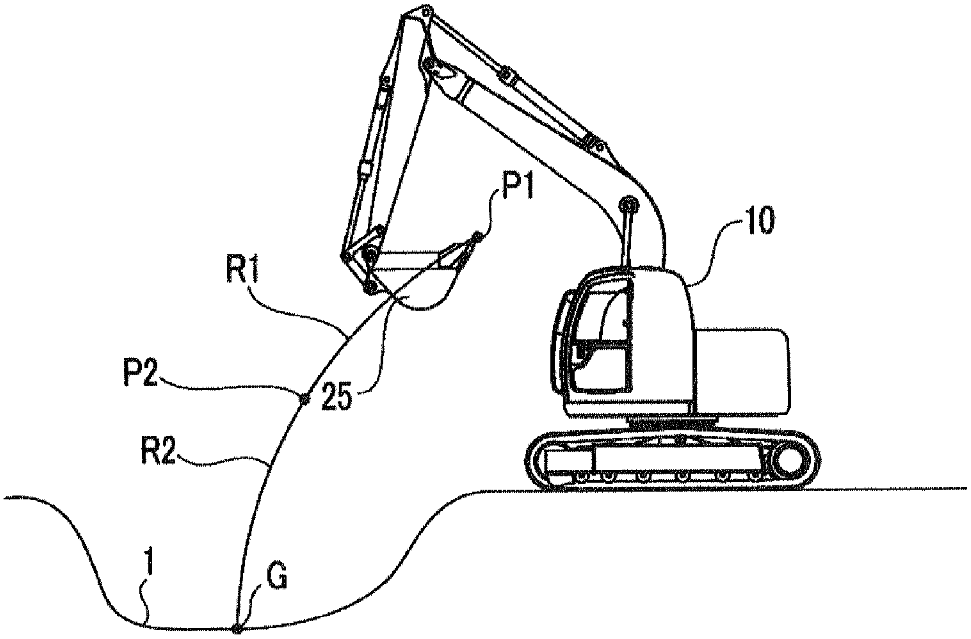
FIG. 8 is a side view for explaining the target track set as a target of a track drawn by the distal end portion of the attachment in the construction machine according to the embodiment.

The target track, the deceleration target timing, and the deceleration target slewing amount may be set and stored in the storage part 74 in advance, or may be stored in the storage part 74 by being set by the operator via the interface 73 or the like. As the target track, for example, as shown in FIG. 8, target tracks R1, R2 indicating at least one of a target position G and a target posture of a specific portion of the construction machine 10 in a time sequential manner can be exemplified. The target tracks R1, R2 are imaginary paths which connect a position P (current position P1) at which the distal end portion of the attachment 25 which is set as the specific portion is arranged at this point of time and the target position G to each other. For example, as shown in FIG. 8, the target tracks R1, R2 are indicated by a line segment which connects the position P1 and the target position G to each other. The line segment may be a curved line, a straight line, or a combination of a curved line and a straight line.

The calculation part 55 calculates an index value which serves as an index indicating a deviation between the operation target and an actual state of the construction machine 10. A specific example of the index value is described later.

The target generation part 75 generates the operation target. The target generation part 75, for example, generates the operation target based on information (machine information) relating to a situation of the construction machine 10. A state of the construction machine 10 includes the external environment state detected by the plurality of external environment state detection parts. In this embodiment, the target generation part 75 generates target tracks R1, R2 shown in FIG. 8 based on the detection results of the external environment state detection parts 45, 46, 47 and 48, for example.

The control device 72 compares at least one of the position and the posture of the specific portion of the construction machine 10 or a state track (actual track) indicating at least one of the position and the posture of the specific portion in a time sequential manner with a plurality of respective predetermined conditions associated with the target tracks R1, R2. The control device 72 is configured to vibrate the vibration applying devices 64, 65 in accordance with a plurality of mutually different vibration patterns which are set in advance corresponding to the plurality of conditions. Accordingly, when any one of the plurality of conditions is satisfied, the control device 72 vibrates the vibration applying devices 64, 65 in accordance with the vibration pattern corresponding to the satisfied condition.

Specifically, each of the vibration applying devices 64, 65 can perform a first vibration applying operation for applying a vibration having a first vibration pattern to the target portion, and a second vibration applying operation for applying a second vibration pattern different from the first vibration pattern to the target portion.

The control device 72 is configured such that, the control device 72 causes the vibration applying devices 64, 65 to perform the first vibration applying operation when the index value calculated by the calculation part 55 satisfies a predetermined first condition, and causes the vibration applying device 64, 65 to perform the second vibration applying operation when the index value calculated by the calculation part 55 satisfies a predetermined second condition which differs from the first condition.

The interface 73 is configured such that an operator can input the target position in the machine coordinate system, that is, the target position which becomes the destination of the specific portion of the construction machine 10. The target position may be specified by inputting coordinates corresponding to the target position by the operator using the interface 73. Further, the target position may be specified as follows. That is, the target position may be specified such that image information relating to the surrounding area of the construction machine 10 is acquired by a three-dimensional scanner or an imaging device provided to the construction machine 10, an operator selects the position corresponding to the target position on a three-dimensional image acquired by the three-dimensional scanner or on an image imaged by the imaging device, and the control device 72 converts the selected position into coordinates corresponding to the target position. The interface 73 is configured to allow the operator to input the positions and the postures of the upper slewing body 14, the working device 15, and the attachment 25 of the construction machine 10 in the machine coordinate system.

Further, the target generation part 75 may be configured to correct the target tracks R1, R2 corresponding to the detection results of the external environment state detection parts 45, 46, 47 and 48 after generating the target track. For example, when an obstacle enters the surrounding area of the construction machine 10 during the operation of the construction machine 10, information (for example, positional information) relating to the obstacle is detected by the external environment state detection part, the information is inputted to the control device 56, and the information is inputted to the control device 72 via the communication devices 57, 71. The target generation part 75 is configured to correct the target tracks R1, R2 such that the working device 15 and the attachment 25 can avoid the obstacle without being brought into contact with the obstacle when the specific portion moves to the target position based on information relating to the obstacle. In this manner, in a case where the external environment state detection parts 45, 46, 47 and 48 detect an external environment state and the target generation part 75 generates a target track (corrects the target track) corresponding to detection results of the external environment state detection parts 45, 46, 47 and 48, even when an external environment situation changes, the operability can be improved by teaching an operator the operation with certainty.

The specific portion is any portion of the construction machine 10. Specifically, the specific portion is set at a distal end portion of the attachment 25, for example. The specific portion may be set in advance or may be set based on information which the operator inputs using the interface 73.

The calculation part 55 calculates coordinates of the distal end portion of the attachment 25 based on the angle information inputted from the first to fourth angle sensors 41 to 44. Further, the calculation part 55 calculates a distance (target distance) from the distal end portion of the attachment 25 to the target position as a remaining distance index value based on the calculated coordinates of the distal end portion of the attachment 25 and the coordinates of the target position inputted using the interface 73.

Even in a case where the position and the posture of the attachment 25 are changed due to an operation of the operation lever 61 by the operator, the calculation part 55 calculates the target distance from the distal end portion of the attachment 25 to the target position as the remaining distance index value.

The control device 72 may be configured to vibrate the vibration applying devices 64, 65 corresponding to the remaining distance index value (the target distance). In such a case, the storage part 74 stores a plurality of remaining distance determination conditions. The plurality of remaining distance determination conditions may be set and stored in the storage part 74 in advance, or may be stored based on information inputted by the interface 73. When the remaining distance index value (the target distance) satisfies any one of the plurality of remaining distance determination conditions, the control device 72 vibrates the vibration applying devices 64, 65 in accordance with a vibration pattern which corresponds to the remaining distance determination condition.

For example, the plurality of remaining distance determination conditions include a first remaining distance determination condition, a second remaining distance determination condition, and a third remaining distance determination condition. The first remaining distance determination condition is set to a condition that the target distance from the distal end portion of the attachment 25 to the target position is more than 1 m and equal to or less than 2 m, the second remaining distance determination condition is set to a condition that the target distance is more than 0.5 m and equal to or less than m, and the third remaining distance determination condition is set to a condition that the target distance is equal to or less than 0.5 m.

In a case where the target distance satisfies the first remaining distance determination condition, the control device 72 vibrates the vibration applying devices 64, 65 in the first vibration pattern, specifically, a vibration pattern in a low frequency range (small vibration frequency), for example. In a case where the target distance satisfies the second remaining distance determination condition, the control device 72 vibrates the vibration applying devices 64, 65 in the second vibration pattern, specifically, a vibration pattern in an intermediate frequency range (vibration frequency larger than the first vibration pattern), for example. In a case where the target distance satisfies the third remaining distance determination condition, the control device 72 vibrates the vibration applying devices 64, 65 in the third vibration pattern, specifically, a vibration pattern in a high frequency range (vibration frequency further larger than the second vibration pattern), for example.

The construction machine 10 according to this embodiment is configured such that the communication device 57 mounted on the main body 11 and the communication device 71 disposed in the operation room 16 mutually transmit information to each other wirelessly. However, the present invention is not limited to such a configuration. In the construction machine 10, the communication device 57 and the communication device 71 may be connected to each other by wire. Further, in the construction machine 10, the control device 56 and the control device 72 may be formed of one control device while omitting the communication devices 57 and 71.

Further, in the construction machine 10, in a case where the communication device 57 mounted on the main body 11 and the communication device 71 disposed in the operation room 16 mutually transmit information to each other wirelessly, the operation room 16 may be disposed at positions spaced apart from the main body 11, and the operation part 61 may be a remote control operation part which performs a remote control of the construction machine 10.

Figure 6:
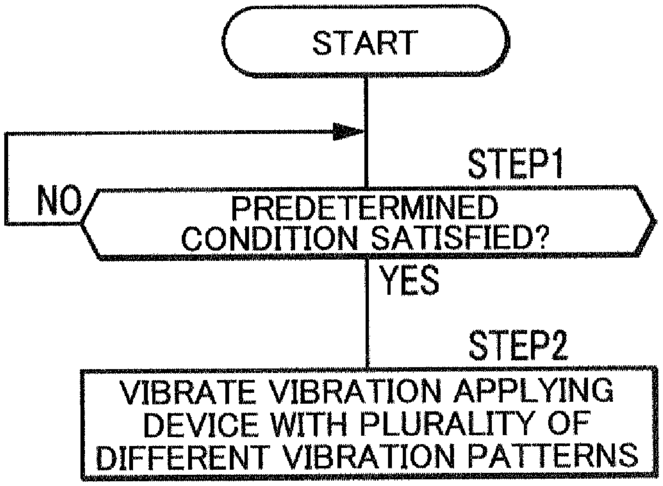
FIG. 6 is a flowchart showing the concept of the present invention.

Next, an operation of the above described construction machine 10 is explained based on the flowchart shown in FIG. 6. As shown in FIG. 6, when a control of the construction machine 10 starts, the control devices 56, 72 determine whether or not an index value which serves as an index indicating the deviation between the operation target and an actual state of the construction machine 10 satisfies a predetermined condition (STEP 1). Specifically, the predetermined condition includes at least the first condition and the second condition. The control devices 56, 72 determine whether or not the index value satisfies the first condition, and also determine whether or not the index value satisfies the second condition.

In a case where the index value satisfies the predetermined condition (YES in STEP1), the control devices 56, 72 perform a processing shown in STEP2. In a case where the index value does not satisfy the predetermined condition (NO in STEP1), the control devices 56, 72 perform a processing shown in STEP1 again.

The control devices 56, 72 cause the vibration applying devices 64, 65 to perform the first vibration applying operation when the index value satisfies the first condition. The control devices 56, 72 cause the vibration applying devices 64, 65 to perform the second vibration applying operation when the index value satisfies the second condition. The first vibration applying operation of the vibration applying devices 64, 65 applies a vibration having the first vibration pattern to the target portion such as the operation lever 61 which the operator touches, for example. The second vibration applying operation applies a vibration having the second vibration pattern to the target portion, for example. With such an operation, the operator can perceive the deviation of the operation of the construction machine 10 with respect to the operation target by the vibration of the first vibration pattern and the vibration of the second vibration pattern which differ from each other. Specifically, in the construction machine 10, the operator can perceive not only whether the deviation indicates the first situation corresponding to the first condition or the second situation corresponding to the second condition, but also a change of the situation of the construction machine 10 from the first situation to the second situation and a change of the situation of the construction machine 10 from the second situation to the first situation. Accordingly, in the construction machine 10, when informing the operator of the deviation of the construction machine 10 in an actual state with respect to the operation target, the construction machine can certainly teach the operator an operation without interrupting a line of sight of the operator, without making it difficult for the operator to hear a teaching sound, and with decreasing the cumbersomeness in the operation of the operation lever. Accordingly, the operability of the construction machine 10 can be enhanced.

Figure 7:
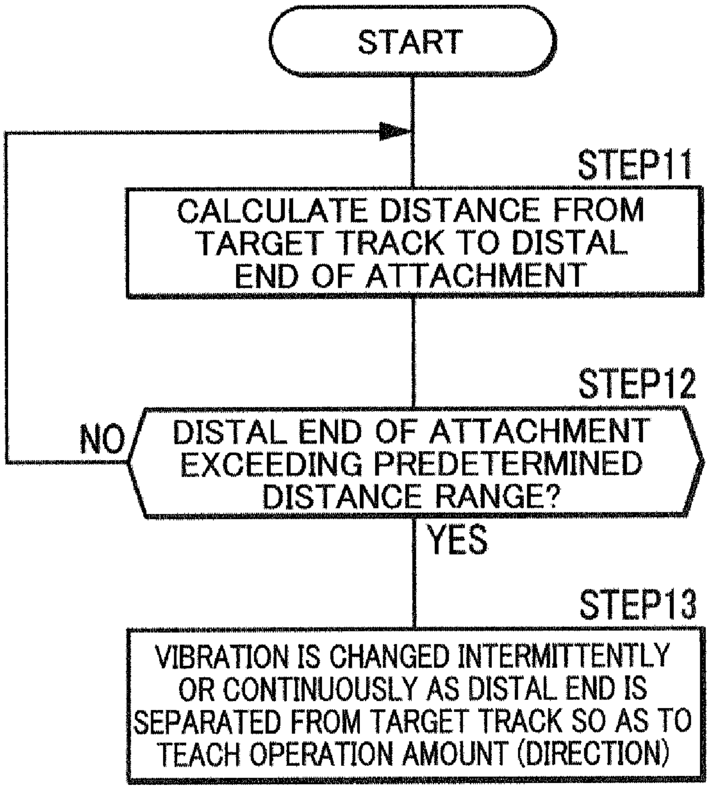
FIG. 7 is a flowchart showing an example of a control in a case where a distance from a target track to a distal end portion of the attachment is used as an index value in the construction machine according to the embodiment.

Next, a specific example of the operation of the construction machine 10 is explained based on a flowchart shown in FIG. 7. In a specific example shown in FIG. 7, the index value is a distance index value which is a distance L5 from the target track to a specific portion (see FIG. 9).

When a control of the construction machine 10 starts, the calculation part 55 calculates the distance L5 (the distance index value) from the target tracks R1, R2 to the distal end portion (specific portion) of the attachment 25 (STEP 11).

The control devices 56, 72 determine whether or not the distance (distance index value) from the target track to the specific portion is within a predetermined distance range (predetermined allowable range) (STEP 12). When the index value exceeds the predetermined allowable range (YES in STEP 12), the control devices 56, 72 perform processing shown in STEP 13. When the index value does not exceed the predetermined allowable range (NO in STEP 12), the control devices 56, 72 perform processing shown in STEP 11 again. The allowable range may be set and stored in advance in the storage part 74, or may be set by the operator through the interface 73 or the like and be stored in the storage part 74.

The control devices 56, 72 allow the vibration applying devices 64, 65 to perform the vibration applying operation corresponding to a condition which the distance index value which is a distance from the target track to the distal end portion of the attachment 25 satisfies (STEP 13). Specifically, the storage part 74 stores a first condition and a second condition. The first condition is a condition that the distance index value is within a predetermined first distance range, and the second condition is a condition that the distance index value is within a predetermined second distance range which differs from the first distance range. Both the first distance range and the second distance range are set to distance ranges larger than an upper limit value (a maximum value) of the allowable range. That is, both a lower limit value (a minimum value) of the first distance range and a lower limit value (a minimum value) of the second distance range are larger than the upper limit value of the allowable range.

In this mode, at least one of the operation part and the contact part is vibrated in accordance with the first vibration pattern or the second vibration pattern corresponding to a magnitude of the distance index value which is a distance of the specific portion with respect to the target track. With such a configuration, the operator can perceive a distance from the specific portion to the target track by the vibration and hence, the specific portion can be guided to the target position through a track close to the target track.

Further, the first vibration pattern and the second vibration pattern by the vibration applying devices 64, 65 may be set such that, as the distal end portion of the attachment 25 approaches more to the position of the alarming target (target position G), the vibration is changed from intermittent vibration to continuous vibration. The first vibration pattern and the second vibration pattern may be set such that, as the distal end portion of the attachment 25 approaches more to the position of the alarming object (target position G), at least one of a frequency and an amplitude of the vibration increases.

By performing the control shown in FIG. 7, an operator can perceive a change in distance from the distal end portion of the attachment 25 which is a specific portion of the construction machine 10 to the target track by the vibration.

Next, further another specific example of the operation of the construction machine 10 is explained with reference to FIGS. 8 and 9. When the construction machine 10 takes a posture shown in FIG. 8, the distal end portion of the attachment 25 of the construction machine 10 is positioned at the position P1. The target tracks R1, R2 are set to substantially arcuate tracks R1, R2 as shown in FIG. 8. The target tracks R1, R2 are tracks which allow the distal end portion of the attachment 25 to move from the position P1 to the position P2 along the target track R1, and further to move from the position P2 to the target position G along the target track R2.

The target tracks R1, R2 are generated as follows, for example. As shown in FIG. 8, the position P1 at which the distal end portion of the attachment 25 is disposed at a point of time is the position upwardly away from a ground, and the target position G is the position on the ground and in front of the position P1. To move the distal end portion of the attachment 25 from the position P1 to the target position G, the operation lever for extending and shrinking the boom cylinder 22, the operation lever for extending and shrinking the arm cylinder 24, and the operation lever for extending and shrinking the bucket cylinder 27 are operated simultaneously. In such a case, the target generation part 75 generates a track capable of moving the specific portion from the position P to the target position G in a state where operation amounts which these operation levers receive are held at fixed amounts, and the generated track is stored in the storage part 74 as the target track. However, a method of generating the target track is not limited to the above-described specific example.

Figure 9:
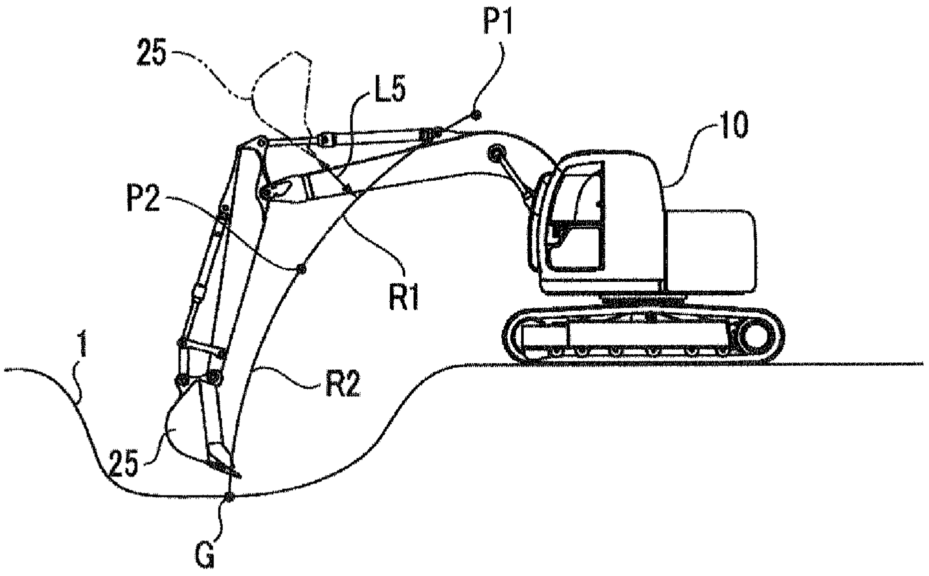
FIG. 9 is a side view for explaining a distance of the distal end portion with respect to the target track when the distal end portion of the attachment moves to a target position in the construction machine according to the embodiment.

The position of the attachment 25 indicated by a double-dashed chain line in FIG. 9 is the position (passage position) which the attachment 25 actually passes when the operation lever 61 is actually operated. At such a passing position, the distal end portion of the attachment 25 is at the position away from the target track R1 by a distance L5 (index value). In a case where the distance L5 exceeds the predetermined allowable range, the vibration applying devices 64, 65 (see FIG. 3) perform the vibration applying operation.

Each of the predetermined plurality of conditions (in this embodiment, the first condition and the second condition) includes a condition that a specific portion is within a predetermined distance range from a target track. The plurality of conditions respectively correspond to a plurality of different situations. Specifically, in a case where the first condition is satisfied, the construction machine 10 is in a situation that a distance from the specific portion to the target track is within the first distance range. In a case where the second condition is satisfied, the construction machine 10 is in a situation that the distance from the specific portion to the target track is within the second distance range.

In this embodiment, at least one of the operation parts 61 and the contact parts 62, 63 vibrates corresponding to a distance from a specific portion to a target track. Accordingly, the specific portion can be guided to the target position on an approximately optimal track and hence, the operability can be enhanced.

In the embodiment shown in FIG. 7 to FIG. 9, the vibration applying operation is performed when the condition is satisfied where a distance index value which is a distance between the target track and the specific portion (the distal end portion of the attachment 25) is within the first distance range or the second distance range. However, the present invention is not limited to such a configuration. The construction machine of the present invention may take into account not only the distance but also the posture of the attachment 25 or the like, for example. As such a modification, the following mode can be exemplified.

That is, in a case of the modification, the operation target includes a target posture. The target posture is set as a target of the posture of the specific portion (second specific portion) at the target position G. Further, in the modification, the index value includes a posture index value which serves as an index indicating the deviation between the target posture and an actual posture of the second specific portion. The second specific portion is set on the bucket 25, for example. That is, the second specific portion which serves as an object of the target posture may be set at a portion different from the specific portion (for example, the distal end portion of the bucket 25) which serves as an object of the above-mentioned target track. Further, in the modification, the first condition includes a condition that the posture index value is within a predetermined first posture range, and the second condition includes a condition that the posture index value is within a predetermined second posture range which differs from the first posture range.

The calculation part 55 can calculate coordinates of a second specific portion of the construction machine 10 in the machine coordinate system based on angle information inputted from the first angle sensor 41, the second angle sensor 42, the third angle sensor 43 and the fourth angle sensor 44. Accordingly, the calculation part 55 can determine whether or not the posture of the second specific portion is within the first posture range, and can determine whether or not the posture of the second specific portion is within the second posture range.

Specifically, the hydraulic excavator shown in FIG. 8 and FIG. 9 which is an example of the construction machine 10 can perform various works such as an excavation work and a leveling work, for example. The excavation work is an operation performed for excavating a ground. Accordingly, when an operator starts the excavation work, the bucket 25 is disposed such that the distal end portion of the bucket 25 is brought into contact with the ground. On the other hand, the leveling work is performed for leveling the ground using a part of a bottom surface of the bucket 25. Accordingly, when the operator starts the leveling work, the bucket 25 is disposed such that a part of the bottom surface of the bucket 25 is brought into contact with the ground. Accordingly, in a case where a next operation performed after the distal end portion of the bucket 25 moves from the position P1 toward the target position G is the excavation work, for example, a target posture of the bucket 25 at the target position G is the posture that the distal end portion of the bucket 25 is brought into contact with the ground. On the other hand, in a case where the next operation is the leveling work, for example, a target posture of the bucket 25 at the target position G is the posture that a portion of the bottom surface of the bucket 25 is brought into contact with the ground. In a case where the next operation is the leveling work, the target position G in FIG. 8 is set to the position slightly upwardly away from the ground.

Next, an operation when the distal end portion of the attachment 25 is moved linearly along the ground is described. When the construction machine 10 takes the posture shown in FIG. 10, the working device 15 extends forward (toward a front side of a vehicle), and the distal end portion of the attachment 25 is disposed at the position P3 on the ground. The target position P4 which is the destination to which the distal end portion of the attachment 25 moves is set to the position P4 which is closer to the lower travelling body than the position P3 on the ground. The target track is set along the ground from the position P3 to the target position P4. In this embodiment, the so-called horizontal pulling operation is performed from the position P3 to the target position P4 using the distal end portion of the attachment 25. In this horizontal pulling operation, it is required to linearly move the distal end portion of the attachment 25 with respect to a construction surface (ground). That is, in the horizontal pulling operation, the target track of the distal end portion of the attachment 25 is a linear track (along the ground) which follows the ground from the position P3 to the target position P4.

By the way, in the construction machine 10 such as a hydraulic excavator, the movement of the boom 21 with respect to the upper slewing body 14, the movement of the arm 23 with respect to the boom 21, and the movement of the attachment 25 with respect to the arm 23 are all basically the circular arc movement. Accordingly, it is difficult to linearly move the attachment 25 along the ground while maintaining the posture that the distal end portion of the attachment 25 is directed downward. To exemplify a specific horizontal pulling operation of the construction machine 10, to move the distal end portion of the attachment 25 from the position P3 to the target position P4, the arm 23 is rotated downward while rotating the boom 21 upward and, further, the attachment 25 is rotated so as to direct the distal end portion of the attachment 25 downward. To return the distal end portion of the attachment 25 to the position P3 from the target position P4, the arm 23 is rotated upward while rotating the boom 21 downward, and the attachment 25 is rotated so as to direct the distal end portion of the attachment 25 downward.

Figure 10:
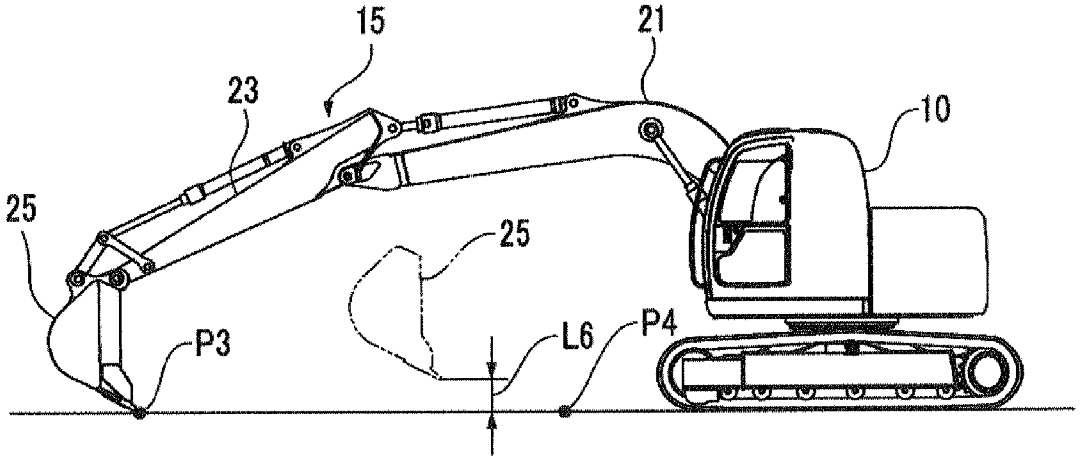
FIG. 10 is a side view for explaining a distance of the distal end portion with respect to the target track when the distal end portion of the attachment is moved to a target position on a linear target track set as a target of a track drawn by the distal end portion of the attachment in the construction machine according to the embodiment.

In this embodiment, when the operation levers 61 are operated so that the attachment 25 linearly moves along the ground in an actual operation, there may be a case where the distal end portion of the attachment 25 is away from the ground by a distance L6 (index value) as indicated by a double-dashed chain line in FIG. 10. When the distance L6 exceeds a predetermined distance range (a predetermined allowable range), the vibration applying devices 64, 65 (see FIG. 3) vibrate. Accordingly, a state that the attachment 25 is away from the ground (target track) is notified to an operator. By repeating such an operation, it is possible to perform an operation of moving the distal end portion of the attachment 25 from the position P3 to the target position P4 along the ground. In the construction machine 10, an operation of linearly moving the distal end portion of the attachment 25 along the ground or the like is often required. In this embodiment, even in the case of performing the horizontal pulling operation which is difficult for an operator who is a novice or a low-level operator, when a distance (index value) from the distal end portion of the attachment 25 to a target track (ground) exceeds an allowable range, the vibration applying devices 64, 65 vibrate thus teaching the operator a desired operation. Accordingly, the operator can easily perform an operation of linearly moving the distal end portion of the attachment 25 along the ground.

Figure 11:
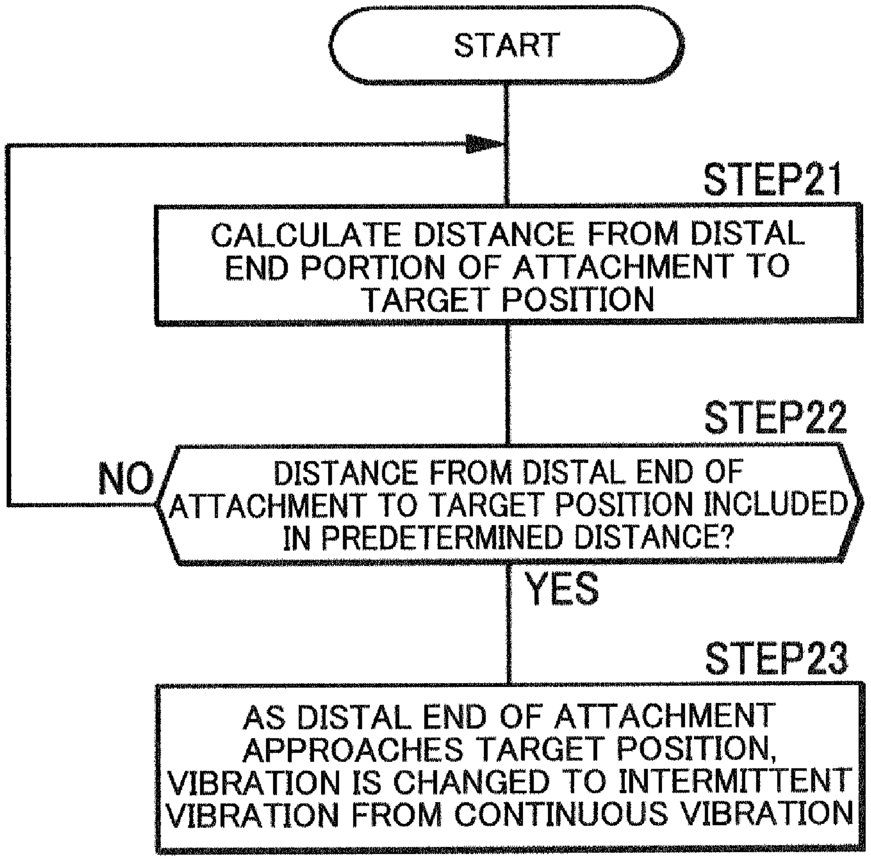
FIG. 11 is a flowchart showing another example of a control in a case where a distance from the target track to the distal end portion of the attachment is used as an index value in the construction machine according to the embodiment.

Next, a specific example of an operation of the construction machine 10 is described based on a flowchart shown in FIG. 11. In the specific example shown in FIG. 11, the remaining distance index value is a distance (target distance) from the distal end portion of the attachment 25 to a target position.

When a control of the construction machine 10 starts, the calculation part 55 calculates a remaining distance index value by calculating a distance from the distal end portion of the attachment 25 to the target position (STEP 21).

The control devices 56, 72 determine whether or not the remaining distance index value which is the distance from the distal end portion of the attachment 25 to the target position satisfies the predetermined condition. In other words, the control devices 56, 72 determine whether or not the target distance is within the predetermined distance range (STEP 22). Specifically, in this embodiment, the control devices 56, 72 respectively determine whether or not the target distance satisfies the first remaining distance determination condition, the second remaining distance determination condition, and the third remaining distance determination condition.

In a case where the remaining distance index value is within the predetermined distance range, specifically, in a case where the remaining distance index value satisfies any one of the first remaining distance determination condition, the second remaining distance determination condition and the third remaining distance determination condition (YES in STEP 22), the control devices 56, 72 perform processing shown in STEP23. In a case where the remaining distance index value is not within the predetermined distance range (NO in STEP 22), the control devices 56, 72 perform processing shown in STEP21 again.

The control devices 56, 72 vibrate the vibration applying devices 64, 65 in accordance with a vibration pattern which corresponds to a condition that the target distance which is the distance from the target position to the distal end portion of the attachment 25 satisfies (STEP 23). Specifically, in a process where the distal end portion of the attachment 25 approaches the target position, when the target distance sequentially changes to a value within a distance range which satisfies the first remaining distance determination condition, to a value within a distance range which satisfies the second remaining distance determination condition, and to a value within a distance range which satisfies the third remaining distance determination condition in this order, the above-mentioned first to third vibration patterns change as follows. The first to third vibration patterns by the vibration applying devices 64 and 65 may be set such that, in the processing, the vibration is changed from an intermittent vibration to a continuous vibration. Further, the first to third vibration patterns may be set such that, in the processing, at least one of the frequency and the amplitude of vibration gradually increases.

By performing the control shown in FIG. 11, an operator can grasp a change in target distance from the distal end portion of the attachment 25 which is a specific portion of the construction machine 10 to the target position by vibration.

Next, further another specific example of the operation of the construction machine 10 is described with reference to FIGS. 12 and 13. In a case where the construction machine 10 takes a posture shown in FIG. 12, the attachment 25 of the construction machine 10 is disposed close to the body 11 and at a high position. A recessed portion 1 is formed on a front of the construction machine 10, and a bottom of the recessed portion 1 is input by the operator as the target position G and stored in the control devices 56, 72. In the posture shown in FIG. 12, a distance (target position) from the distal end portion of the attachment 25 which is the specific portion to the target position G is L1.

Figure 12:
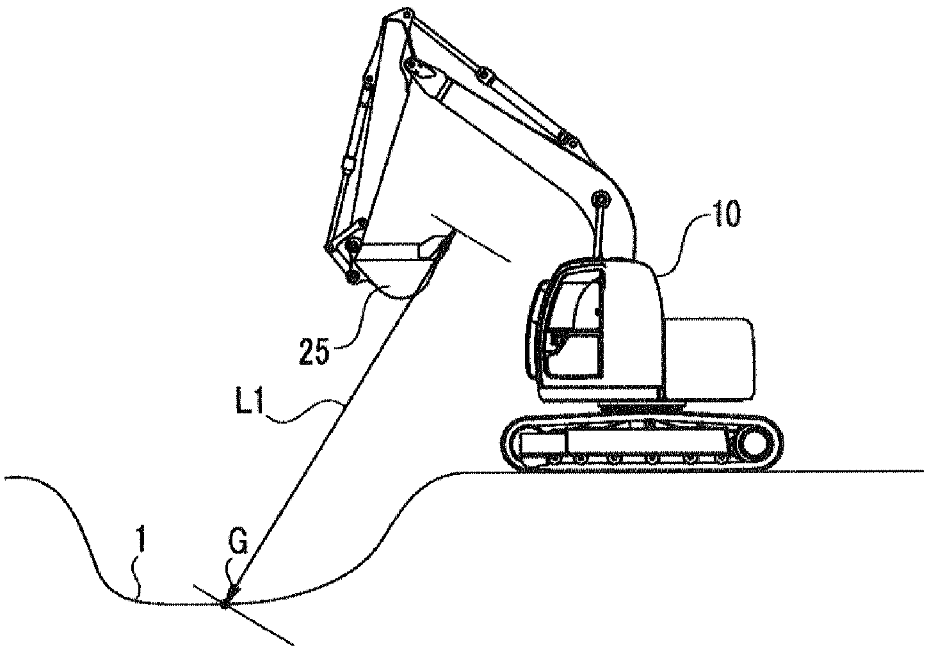
FIG. 12 is a side view for explaining a distance from the target position to the distal end portion of the attachment.

FIG. 12 shows the position and the posture of the attachment 25 when the distance from the distal end portion of the attachment 25 to the target position G decreases in the order of a target distance L2, a target distance L3, and a target distance L4. The target distance L2 satisfies the first remaining distance determination condition, that is, the condition that the distance from the distal end portion of the attachment 25 to the target position G is more than 1 m and equal to or less than 2 m. The target distance L3 satisfies the second remaining distance determination condition, that is, the condition that the distance from the distal end portion of the attachment 25 to the target position G is more than 0.5 m and equal to or less than 1 m. The target distance L4 satisfies the third remaining distance determination condition, that is, the condition that the distance from the distal end portion of the attachment 25 to the target position G is equal to or less than 0.5 m.

Figure 13:
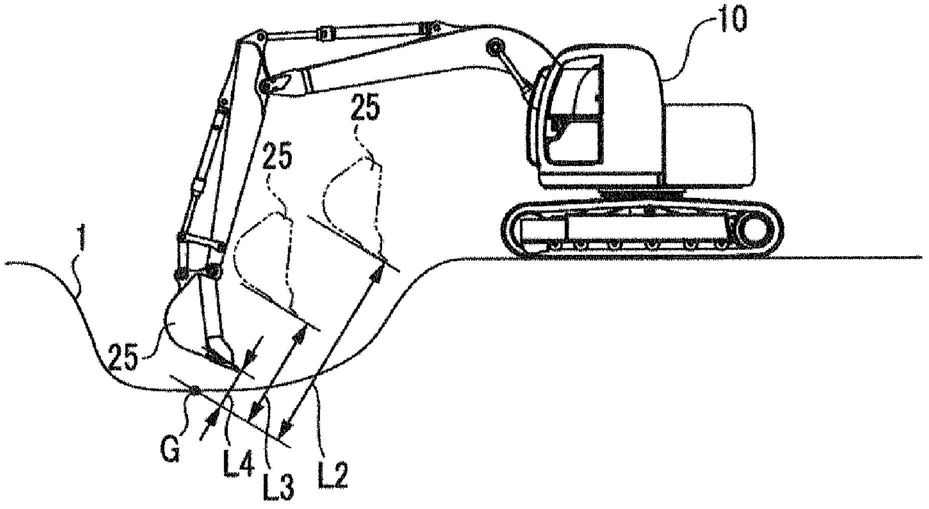
FIG. 13 is a side view for explaining an example of an operation of the construction machine when the distal end portion of the attachment approaches the target position.

When the distal end portion of the attachment 25 approaches the target position G from the position shown in FIG. 12, and the target distance from the distal end portion of the attachment 25 to the target position G becomes L2 shown in FIG. 13 and is within the distance range which satisfies the first remaining distance determination condition, the control devices 56, 72 vibrate the vibration applying devices 64, 65 (see FIG. 3) at a first vibration frequency.

When the attachment 25 further moves, and the target distance from the distal end portion of the attachment 25 to the target position G becomes L3 shown in FIG. 13 and is within the distance range which satisfies the second condition, the control devices 56, 72 vibrate the vibration applying devices 64, 65 (see FIG. 3) at a second vibration frequency. The second vibration frequency is higher than the first vibration frequency. When the attachment 25 further moves, and the target distance from the distal end portion of the attachment 25 to the target position G becomes L4 shown in FIG. 13 and is within the distance range which satisfies the third condition, the control devices 56, 72 vibrate the vibration applying devices 64, 65 (see FIG. 3) at a third vibration frequency. The third vibration frequency is higher than the second vibration frequency.

Figure 14:
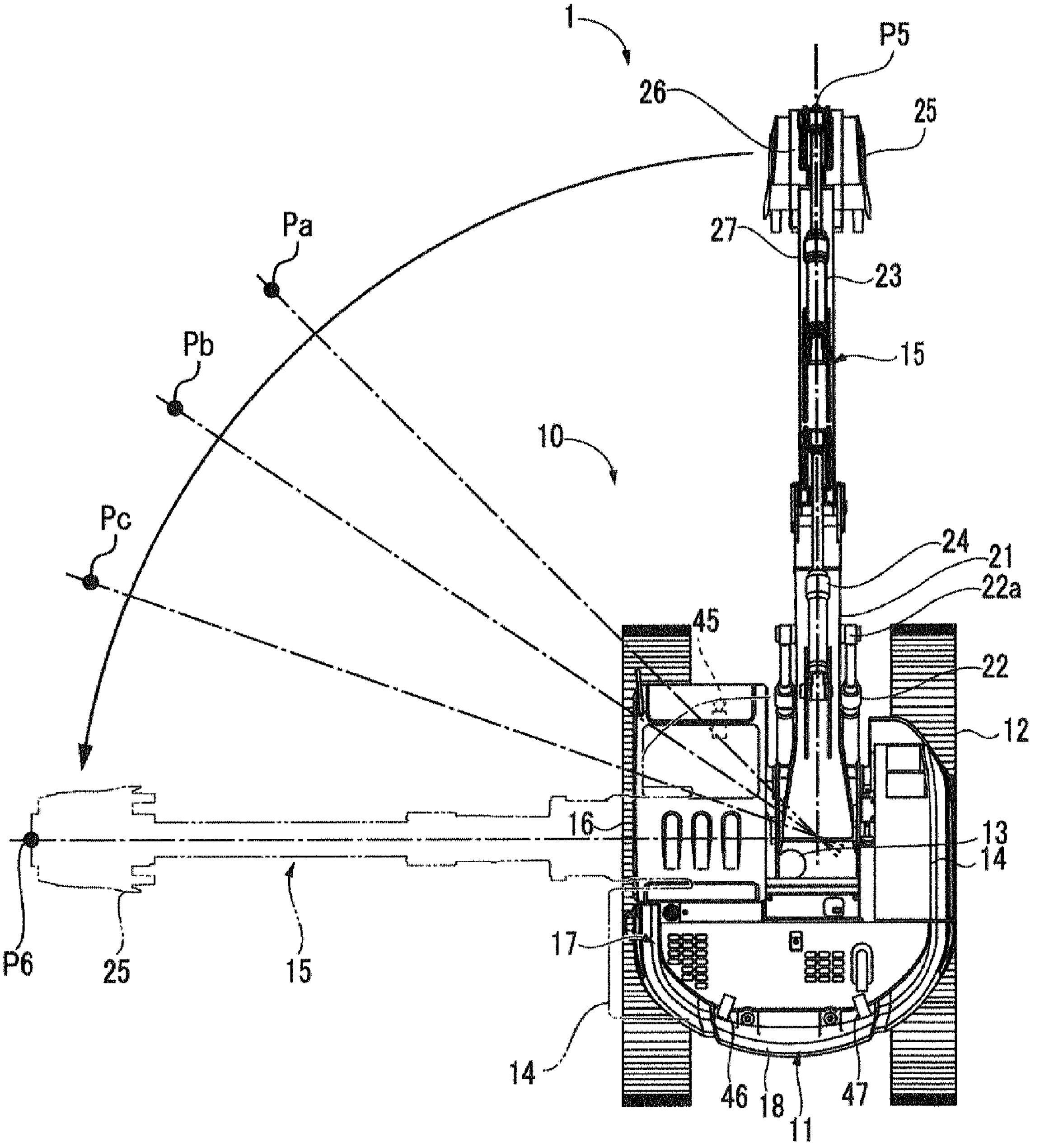
FIG. 14 is a plan view for explaining a slewing operation of an upper slewing body in the construction machine according to the embodiment.

Next, further another embodiment of the present invention is described. An embodiment shown in FIG. 14 relates to an operation where the upper slewing body 14 is turned from a position P5 which is a position where the slewing motion of the upper slewing body 14 starts toward a target position P6 which is set as a target of a position where the slewing operation stops. Specifically, as shown in FIG. 14, the construction machine 10 is in a state where the upper slewing body 14 faces a front side of the vehicle and the working device 15 extends frontward, and a distal end portion of the attachment 25 is at the position P5. A target track is a track of the distal end portion of the attachment 25 when the upper slewing body 14 slews in a state where the working device 15 maintains its posture. The storage part 74 stores sizes of the upper slewing body 14, the boom 21, the arm 23, and the attachment 25 and lengths between joints and weights of these constitutional elements. The calculation part 55 calculates current positions and postures of the upper slewing body 14, the boom 21, the arm 23 and the attachment 25 respectively based on angle information from the angle sensors 41, 42, 43 and 44. The calculation part 55 can calculate positions and postures of the upper slewing body 14, the boom 21, the arm 23 and the attachment 25 not only in a case where the distal end portion of the attachment 25 is at the position P5 but also in a case where the distal end portion of the attachment 25 is at any position during slewing of the upper slewing body 14.

In this embodiment, the control device 72 calculates an ideal operation amount of the operation lever 61 for slewing the upper slewing body 14 based on an inertial force generated during slewing and a target track, and teaches an operator to perform an operation such that the distal end portion of the attachment 25 reaches the target position P6 and the target posture by actually performing an operation amount of the operation part 61.

Due to such an operation, in the slewing work of the construction machine 10, it is possible to teach the operator a slewing command operation so as to enhance the operability of the upper slewing body 14 at the time of slewing the upper slewing body 14.

In this embodiment, in the same manner as the above-described embodiment, to move a specific portion of the construction machine 10 to the target position P6, an operation target is set as a target of an operation of the construction machine 10, and the operation target is at least one of a deceleration target timing and a deceleration target slewing amount. The operation target is generated by the target generation part 75, and stored in the storage part 74. In addition, the calculation part 55 calculates an index value which serves as an index indicating a deviation between the operation target and an actual state of the construction machine 10. The index value is a time index value in a case where the operation target is the deceleration target timing. The index value is a slewing index value in a case where the operation target is the deceleration target stewing amount. In this embodiment, the specific portion is set at the distal end portion of the bucket 25. However, the embodiment is not limited to such a configuration, and the specific portion is not limited to the distal end portion of the bucket 25, and may be set at a part of the arm 23 or a part of the boom 21, for example.

Figure 15:
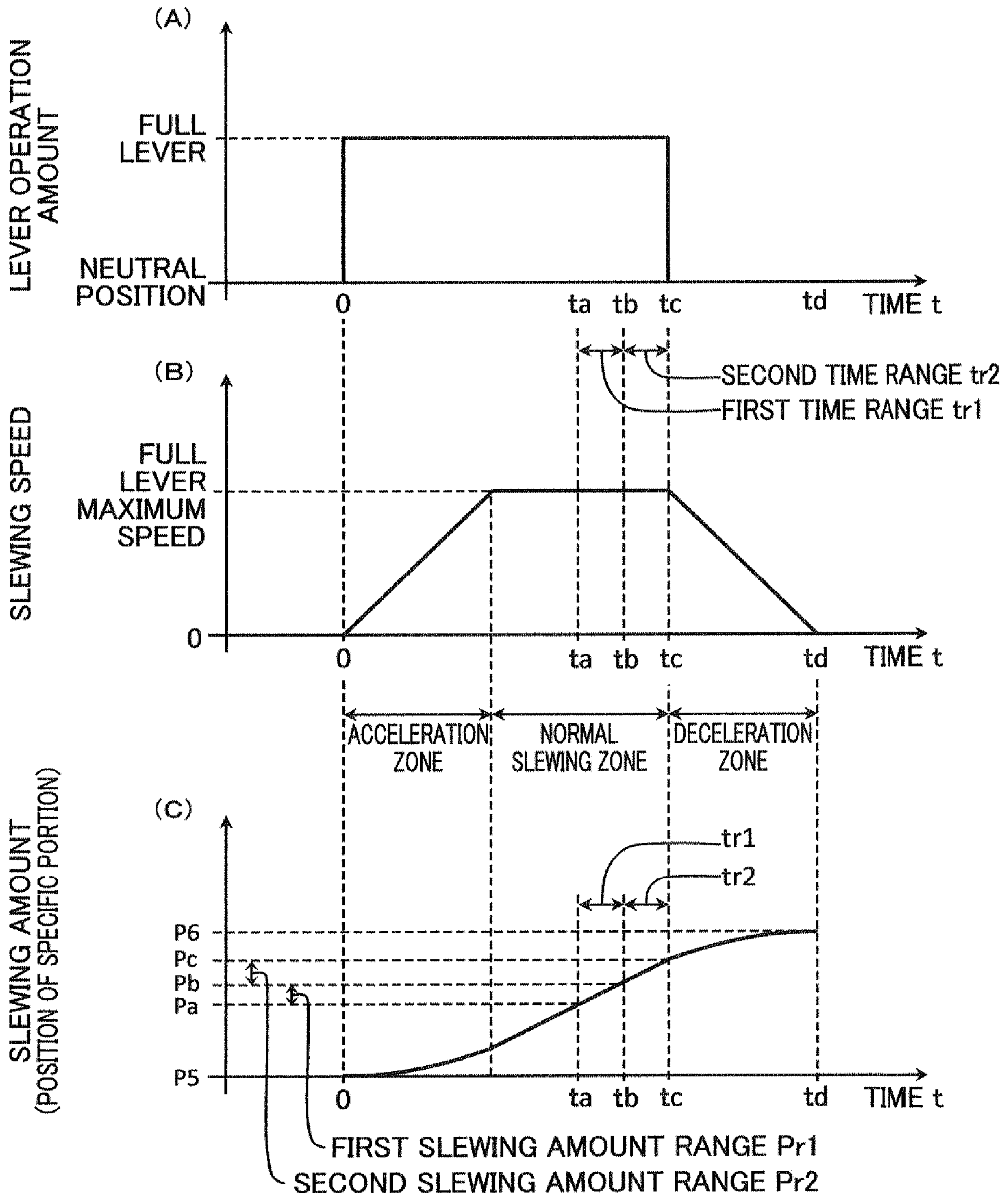
FIG. 15 is a graph for explaining a slewing operation of the upper slewing body in the construction machine according to the embodiment.

Hereinafter, this embodiment is described specifically. FIG. 15 is a graph for explaining a slewing operation of the upper slewing body 14 in the construction machine 10 according to this embodiment.

When the slewing operation lever 61 (see FIGS. 3 and 4) is at a neutral position as shown in a graph (A) of FIG. 15, the upper slewing body 14 does not perform a slewing operation with respect to the lower travelling body 12 as shown in a graph (B) of FIG. 15. Accordingly, a slewing speed of the upper slewing body 14 is zero, and the upper slewing body 14 is stopped at the position P5 (slewing start position) as shown in a graph (C) of FIG. 15. In a case where the operator causes the upper slewing body 14 to perform the slewing operation, the operator applies a slewing command operation to the operation lever 61. Specifically, as shown in the graph (A), for example, when a slewing command operation of an operation amount corresponding to a full lever is applied to the operation lever 61, a slewing speed of the upper slewing body 14 is gradually increased as shown in the graph (B), and a slewing amount (slewing angle) of the upper slewing body 14 is gradually increased as shown in the graph (C) (acceleration zone in FIG. 15). Accordingly, as shown in FIG. 14, the upper slewing body 14 slews in one direction (an arrow direction) from the position P5 toward the target position P6.

The construction machine 10 has a timer, and the timer measures an elapsed time from a point of time that the slewing command operation is applied to the operation lever 61. The elapsed time measured by the timer is inputted to the calculation part 55 and the control device 56. A slewing amount (slewing angle) of the upper slewing body 14 is measured by the fourth angle sensor 44, and the measured slewing amount is inputted to the calculation part 55 and the control device 56. The measured slewing amount may be a slewing amount with reference to the slewing start position P5 (a slewing angle from the position P5), and may be a slewing amount with reference to a preset arbitrary reference position (a slewing angle from the reference position).

As shown in the graph (A) of FIG. 15, when the slewing command operation of an operation amount corresponding to the full lever is continuously applied to the operation lever 61, a slewing speed is maintained at a maximum speed after the slewing speed reaches the maximum speed of the full lever as shown in the graph (B) (normal slewing zone in FIG. 15). In this normal slewing zone, the upper slewing body 14 slews at a fixed stewing speed.

Thereafter, when the position of the distal end portion (specific portion) of the bucket 25 gets close to the target position P6, an operator applies a slewing deceleration command operation to the operation lever 61 such that the operation lever 61 returns to the neutral position from the position of the full lever as shown in the graph (A). The slewing deceleration command operation is an operation for stopping the slewing operation of the upper slewing body 14. When the stewing deceleration command operation is performed, a slewing brake action acts on the upper slewing body 14 in the construction machine 10. As a result, as shown in the graph (B), the slewing speed is gradually decreased (deceleration zone in FIG. 15). Then, when the slewing speed becomes zero, the slewing operation of the upper slewing body 14 is stopped.

The slewing brake action is briefly described hereinafter. The construction machine 10 includes: a hydraulic motor which drives the upper stewing body 14 slewably; a hydraulic pump which functions as a hydraulic source of the hydraulic motor; a control valve for switching a rotational direction of the hydraulic motor (a slewing direction of the upper slewing body 14); a right slewing oil passage and a left slewing oil passage connected to ports on both sides of the hydraulic motor for driving the upper slewing body 14 in both left and right directions; and a pair of relief valves which function as brake valves connected to the respective slewing oil passage. When the operation lever 61 returns from the full lever position to the neutral position, for example, the supply of a working oil from the hydraulic pump to the hydraulic motor is stopped, and the slewing brake action is activated by a relief operation of the relief valve, and the hydraulic motor is decelerated. A time necessary for stopping the slewing operation from a point of time that the slewing deceleration command operation is performed, and a slewing amount of the upper slewing body 14 which slews from a point of time that the slewing deceleration command operation is performed until the slewing operation is stopped are decided based on the kinetic energy of the upper slewing body 14 at a time of operating the slewing deceleration command operation and a characteristic of the slewing brake action (a characteristic of a braking force). The characteristic of the slewing brake is a characteristic particular to construction machines in general. Conventionally, an operator has sensuously determined a timing of the sewing deceleration command operation for stopping a specific portion at a target position. On the other hand, according to this embodiment, it is possible to teach an operator a preferable timing of the slewing deceleration command operation. The embodiment is specifically described hereinafter.

First, the description is made hereinafter with respect to a case where the operation target is a deceleration target slewing amount.

In this embodiment, the characteristic of the slewing brake action is stored in the storage part in advance in the construction machine 10. The kinetic energy is calculated based on a moment of inertia and an angular velocity. Specifically, the kinetic energy is calculated based on the positions and the postures of the boom 21, the arm 23, and the bucket 25, a slewing speed, and a weight of a load such as earth and sand loaded on the bucket 25. The positions and postures, the slewing speed, and the weight of the load are calculated by the calculation part 55 based on angle information from the angle sensors 41, 42, 43 and 44, the holding pressure information from the load measurement parts 51, 52, 53 and 54 and the like. The calculation part 55 fixedly or periodically calculates the kinetic energy during a swiveling operation of the upper slewing body 14.

The target generation part 75 calculates, based on the calculated kinetic energy and the characteristic of the braking force stored in the storage part, an estimated required slewing amount from a point of time that the operation lever 61 is assumed to have received the slewing deceleration command operation to a point of time that the slewing operation is stopped. The estimated required slewing amount is fixedly or periodically calculated by the target generation part 75 during the slewing operation of the upper slewing body 14. The graphs (A), (B), and (C) of FIG. 15 show the behavior of the slewing operation in a case where the operation lever 61 receives the slewing deceleration command operation at an ideal timing where the slewing operation of the upper slewing body 14 is stopped at a point of time that the specific portion reaches the target position P6. In this embodiment, in a case where the slewing speed is fixed, the estimated required slewing amount becomes also fixed and hence, the estimated required slewing amount corresponds to a value obtained by subtracting a slewing amount Pc from a slewing amount P6 on an axis of ordinates in the graph (C). In other words, the estimated required slewing amount is a slewing amount corresponding to a magnitude of the slewing amount from the slewing amount Pc to the slewing amount P6.

The target generation part 75 calculates a stop target slewing amount corresponding to the target position P6 based on information such as coordinates of the position P5, coordinates of the target position P6 and the like. The stop target slewing amount is a slewing amount of the upper slewing body 14 based on which the specific portion which starts the movement from the position P5 can be stopped at the target position P6, and is the slewing amount P6 on the axis of ordinates in the graph (C). The target generation part 75 calculates the deceleration target slewing amount based on the stop target slewing amount and the estimated required slewing amount. The deceleration target slewing amount is a target of a slewing amount at which the upper slewing body 14 starts a deceleration operation when the operation lever 61 receives the slewing deceleration command operation for stopping the slewing operation of the upper slewing body 14. The deceleration target slewing amount is a slewing amount Pc on the axis of ordinates in the graph (C).

The calculation part 55 fixedly or periodically calculates the slewing index value during the slewing operation of the upper slewing body 14. The slewing index value is an index value indicating a slewing amount of the upper slewing body 14 at a point of time that the slewing index value is calculated.

The control device causes the vibration applying devices 64, 65 to perform the first vibration applying operation when the slewing index value calculated by the calculation part 55 satisfies a predetermined first condition, and causes the vibration applying devices 64, 65 to perform the second vibration applying operation when the slewing index value calculated by the calculation part 55 satisfies a predetermined second condition which differs from the first condition.

The first condition is, for example, a condition that the slewing index value is within a predetermined first slewing amount range Pr1 before the slewing index value reaches the deceleration target slewing amount Pc, and the second condition is, for example, a condition that the slewing index value is within a predetermined second slewing amount range Pr2 which is closer to the deceleration target slewing amount Pc than the first slewing amount range Pr1 before the slewing index value reaches the deceleration target slewing amount Pc. In the specific example of this embodiment, the first slewing amount range Pr1 is a range equal to or more than the slewing amount Pa and less than the slewing amount Pb on the axis of ordinates in the graph (C), and the second slewing amount range Pr2 is a range equal to or more than the slewing amount Pb and less than the slewing amount Pc on the axis of ordinates in the graph (C).

In a case where the slewing index value calculated by the calculation part 55 is within the first slewing amount range Pr1, vibration having the first vibration pattern is applied to the target portion by the vibration applying devices 64, 65, and in a case where the slewing index value is within the second slewing amount range Pr2, vibration having the second vibration pattern is applied to the target portion by the vibration applying devices 64, 65. Accordingly, an operator can perceive in a stepwise manner that a slewing amount of the upper slewing body 14 is approaching the deceleration target slewing amount Pc before the slewing amount of the upper slewing body 14 reaches the deceleration target slewing amount Pc by the vibration having the first vibration pattern and the vibration having the second vibration pattern.

In this embodiment, a frequency of vibration or an amplitude of vibration by the vibration applying devices 64, 65 becomes large in a case where the slewing index value is within the second slewing amount range Pr2 which is closer to the deceleration target slewing amount Pc than the first slewing amount range Pr1 compared to a case where the slewing index value is within the first slewing amount range Pr1. With such a configuration, an operator can perceive in a stepwise manner that a slewing amount of the upper slewing body 14 is approaching the deceleration target slewing amount Pc by a change in frequency or amplitude of vibration, and the specific portion can be more easily stopped at the target position P6 or in the vicinity of the target position P6.

Next, the description is made with respect to a case where the operation target is a deceleration target timing.

The target generation part 75 calculates an estimated required time until the slewing operation is stopped from a point of time that the operation lever 61 is assumed to have received the slewing deceleration command operation based on the kinetic energy calculated by the calculation part 55 and a characteristic of a braking force stored in the storage part. The estimated required time is fixedly or periodically calculated by the target generation part 75 during the slewing operation of the upper slewing body 14. In this embodiment, in a case where the slewing speed is fixed, the estimated required time is also fixed and hence, the estimated required time corresponds to a length of time from a time tc to a time td on axis of abscissas in the graphs (A), (B), and (C).

Further, the target generation part 75 calculates a time necessary for the upper slewing body 14 to slew by the stop target slewing amount P6 (stop target time td). The target stop time td is calculated based on the kinetic energy and the brake characteristic, for example. The target generation part 75 calculates the deceleration target timing based on the stop target time td and the estimated required time. The deceleration target timing is a target of a timing at which the upper slewing body 14 starts a deceleration operation in response to the slewing deceleration command operation given to the operation lever 61, the slewing deceleration command operation being a operation for stopping the slewing operation of the upper slewing body. The deceleration target timing is a time tc on the axis of abscissas in the graphs (A), (B), and (C).

The calculation part 55 constantly or periodically calculates the time index value during the slewing operation of the upper slewing body 14. The time index value is a time index value which serves as an index of a time difference with the deceleration target timing tc, and is an index value indicating a current point of time which is a point of time that the time index value is calculated.

The control device causes the vibration applying devices 64, 65 to perform the first vibration applying operation when the time index value calculated by the calculation part 55 satisfies a predetermined first condition, and causes the vibration applying devices 64, 65 to perform the second vibration applying operation when the time index value calculated by the calculation part 55 satisfies a predetermined second condition which differs from the first condition. The first condition is a condition that the time index value is within a predetermined first time range tr1 before the deceleration target timing tc, and the second condition is a condition that the time index value is within a predetermined second time range tr2 before the deceleration target timing and closer to the deceleration target timing tc than the first time range tr1. In the specific example of this embodiment, the first time range tr1 is a range equal to or more than a time ta and less than a time tb on the axis of abscissas in the graphs (A), (B), and (C), and the second time range tr2 is a range equal to or more than the time tb and less than the time tc on the axis of abscissas.

In a case where the time index value calculated by the calculation part 55 is within the first time range tr1, a vibration having the first vibration pattern is applied to the target portion by the vibration applying devices 64, 65, and in a case where the time index value is within the second time range tr2, a vibration having the second vibration pattern is applied to the target portion by the vibration applying devices 64, 65. Accordingly, an operator can perceive in a stepwise manner that a slewing operation of the upper slewing body 14 is approaching the deceleration target timing tc before the slewing amount of the upper slewing body 14 reaches the deceleration target timing to by the vibration having the first vibration pattern and the vibration having the second vibration pattern.

Further, in this embodiment, a frequency of vibration or an amplitude of vibration by the vibration applying devices 64, 65 is more increased in a case where the time index value is within the second time range tr2 which is closer to the deceleration target timing tc than the first time range tr1 compared to a case where the time index value is within the first time range tr1. With such a configuration, an operator can perceive in a stepwise manner that the deceleration target timing tc is approaching by a change in frequency or amplitude of vibration, and the specific portion can be more easily stopped at the target position P6 or in the vicinity of the target position P6.

Figure 16:
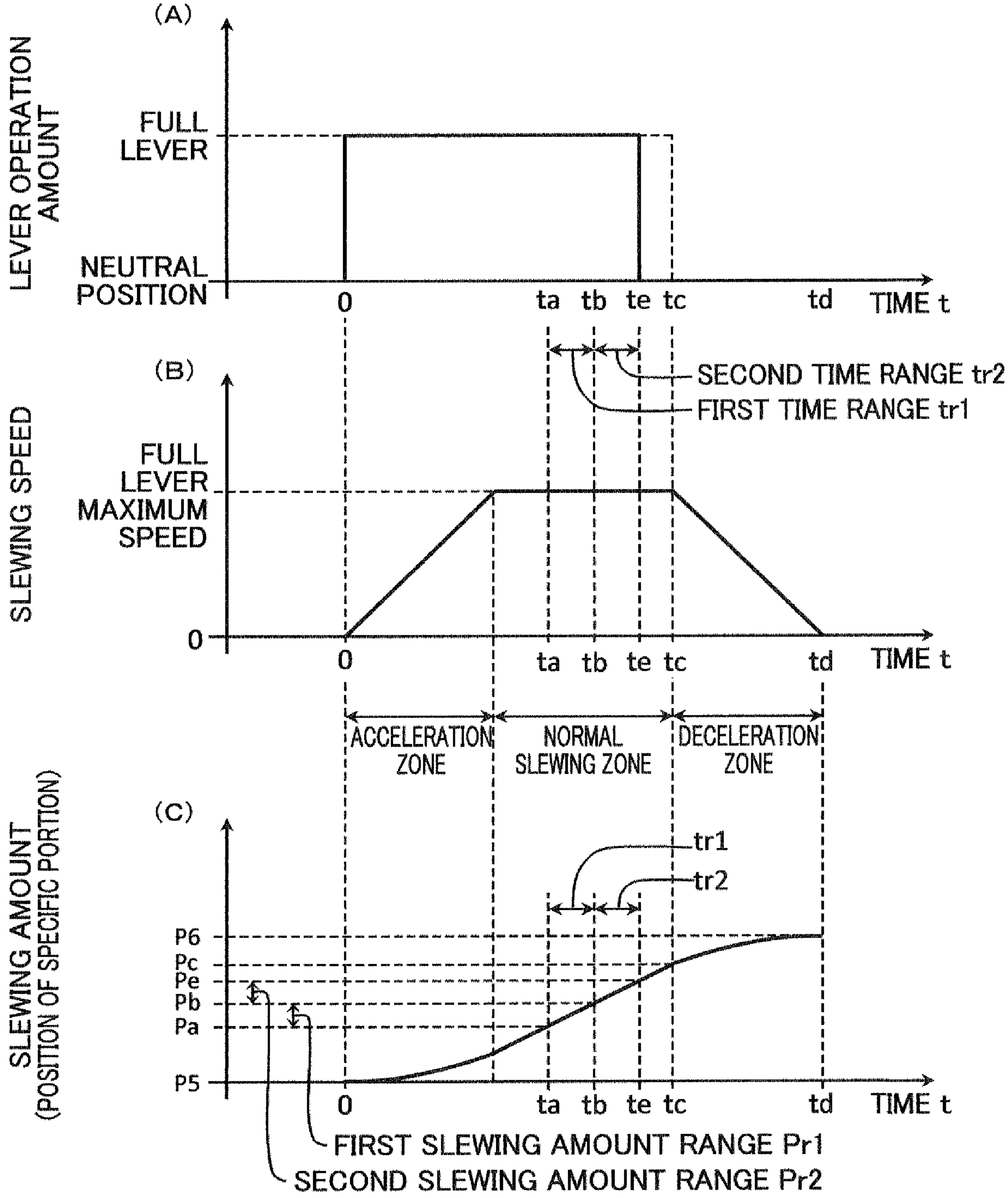
FIG. 16 is a graph for explaining the slewing operation of the upper slewing body in the construction machine according to the embodiment.

FIG. 16 is a graph for explaining the slewing operation of the upper slewing body 14, and shows a modification of the embodiment shown in FIG. 15. In this modification, a control is performed by taking into account that a gap is generated between a timing at which the operation lever 61 receives the slewing deceleration command operation and a timing at which the braking force actually starts to act. That is, in the modification, a control is performed by taking into account a response delay time by the hydraulic motor.

The response delay time corresponds to a length of a time from a time tc to a time tc on an axis of abscissas in each graph shown in FIG. 16. Specifically, as shown in the graphs (A) and (B) of FIG. 16, in a case where the above-described response delay occurs, a time difference (response delay time) is generated between a time tc at which an operator applies the stewing deceleration command operation for returning the operation lever 61 from the full lever position to the neutral position to the operation lever 61 and a time tc at which the braking force acts so that the deceleration of the slewing speed is started. A characteristic relating the response delay time (that is, a value obtained by subtracting the time tc from the time tc) is stored in the storage part in advance.

Accordingly, in this modification, the target generation part 75 calculates the above-described deceleration target slewing amount Pc and, at the same time, and also calculates a second target slewing amount Pe corresponding to a slewing amount at a point of time earlier than the deceleration target slewing amount Pc by a magnitude corresponding to the response delay time. Further, in this modification, the target generation part 75 calculates the above-described deceleration target timing tc and, at the same time, calculates a second target timing tc at a point of time earlier than the deceleration target timing tc by a magnitude corresponding to the response delay time.

Specifically, the target generation part 75 calculates the deceleration target slewing amount Pc based on the stop target slewing amount and the estimated required slewing amount in the same manner as the embodiment shown in FIG. 15, and calculates a second target slewing amount Pe by subtracting a slewing amount of a magnitude corresponding to the response delay time from the deceleration target slewing amount Pc (graphs (B), (C) in FIG. 16). In this modification, the first slewing amount range Pr1 is a range equal to or more than the slewing amount Pa and less than the slewing amount Pb on the axis of ordinates of the graph (C) in FIG. 16, and the second slewing amount range Pr2 is a range equal to or more than the slewing amount Pb and less than the slewing amount Pe on the axis of ordinates of the graph (C) in FIG. 16.

Also, the target generation part 75 calculates the deceleration target timing tc based on the stop target time and the estimated required time in the same manner as the embodiment shown in FIG. 15, and calculates a second target timing tc by subtracting a time of a magnitude corresponding to the response delay time from the deceleration target timing tc (graphs (B), (C) in FIG. 16). In this modification, the first time range tr1 is a range equal to or more than the time ta and less than the time tb on the axis of abscissas of the graphs (A), (B), and (C) in FIG. 16, and the second time range tr2 is a range equal to or more than the time tb and less than the time tc on the axis of abscissas.

In a case where a response delay occurs due to the hydraulic motor, by performing a control by taking into account the response delay time as in the case of the modification, information including the response delay can be transmitted to the operator. Other features of the modification are similar to those of the embodiment shown in FIG. 15 and hence, their detailed description is omitted. In a case where the upper slewing body 14 is not rotatably driven by the hydraulic actuator (hydraulic motor) and the above-mentioned response delay is not generated or the response delay is small, it is unnecessary to perform the control shown in FIG. 16, and it is sufficient to perform the control shown in FIG. 15.

Next, the manner of operation and advantageous effects other than those described above are described. The control devices 56, 72 may perform the following control. Specifically, the control device causes the vibration applying devices 64, 65 to vibrate in accordance with a vibration pattern which is set for each of a predetermined plurality of conditions when a track (state track) indicating at least one of a position and a posture of a specific portion of the construction machine 10 or a time series of at least one of the position and the posture corresponds to any one of the plurality of conditions with respect to a target track. Accordingly, a line of sight of the operator is not interrupted or it does not become difficult for the operator to hear a teaching sound. Further, for example, the operation lever 61 only vibrates and is not moved by an assist force and hence, the cumbersomeness in operation of the operation lever 61 can be reduced and hence, it is possible to teach an operator the operation with certainty thus enhancing the operability.

The vibration applying device 64 is provided to a grip of the operation part 61. Accordingly, an operator can perceive with certainty the vibration through the grip of the operation part which the operator grasps with his/her hand and hence, it is possible to teach the operator an operation without interrupting a line of sight of the operator and without imparting cumbersomeness to the operator.

The vibration applying device 64 is detachably mounted on the operation lever 61 and hence, the vibration applying device 64 can be mounted on the standard operation part 61 later.

The vibration applying device 65 is provided to the armrest 63. Accordingly, the vibration is transmitted to an operator through the arm of the operator and hence, it is possible to further improve the perception of the vibration by the operator.

Further, the predetermined condition and the predetermined plurality of vibration patterns can be changed or adjusted. Accordingly, by setting the vibration pattern such that each operator can easily perceive vibration, the operator can more easily perceive the vibration.

In the embodiment, the vibration applying devices 64, 65 are provided to both the operation parts 61 and the contact parts 63. However, the present invention is not limited to such a configuration, and it is sufficient that the vibration applying devices 64, 65 be provided to at least one of the operation part 61 and the contact parts 62, 63.

In the embodiment, the external environment state detection parts 45, 46, 47 and 48 are provided to the construction machine 10. However, the present invention is not limited to such a configuration. An external environment state may be detected from the outside of the construction machine 10 by arranging the external environment state detection parts 45, 46, 47, 48 around the construction machine 10.

In the embodiment, the vibration applying devices 64, 65 may be vibrated when the distal end portion of the attachment 25 or the like is disposed away from the target track by a predetermined distance or more, and the vibration applying devices 64, 65 may be vibrated as the distal end portion of the attachment 25 approaches the target position. However, the present invention is not limited to such a configuration. The configuration may be adopted where the condition for vibrating the vibration applying devices 64, 65 may be reversed such that the vibration applying devices 64, 65 may be vibrated when the distal end portion of the attachment 25 or the like from the target track is within the predetermined distance, or the vibration by the vibration applying devices 64, 65 may be weakened as the distal end portion of the attachment 25 approaches the target position.

As described above, there is provided the construction machine capable of appropriately notifying an operator of various changes in situations of the construction machine.

[1] Provided is a construction machine including: a lower travelling body; an upper slewing body mounted on the lower travelling body so as to be slewable; a working device rotatably connected to the upper slewing body; an attachment connected to a distal end of the working device; an operation part which receives an operation by an operator for operating at least one of the lower travelling body, the upper slewing body, the working device, and the attachment; a vibration applying device which applies a vibration to a target portion which is at least a part of a portion which is brought into contact with a body of the operator who operates the operation part; a storage part which stores an operation target set as a target of an operation of the construction machine for moving a specific portion of the construction machine to a target position set as a destination to which the specific portion of the construction machine moves; a calculation part which calculates an index value which serves as an index indicating a deviation between the operation target and an actual state of the construction machine; and a control device which controls an operation of the vibration applying device. The vibration applying device is configured to perform a first vibration applying operation for applying a vibration having a first vibration pattern to the target portion, and a second vibration applying operation for applying a vibration having a second vibration pattern different from the first vibration pattern to the target portion. The control device is configured to cause the vibration applying device to perform the first vibration applying operation when the index value calculated by the calculation part satisfies a predetermined first condition, and to cause the vibration applying device to perform the second vibration applying operation when the index value calculated by the calculation part satisfies a predetermined second condition different from the first condition.

In this construction machine, the storage part stores the operation target which is set as a target of an operation of the construction machine, and the calculation part calculates an index value which serves as an index indicating a deviation between the operation target and an actual state of the construction machine. The control device causes the vibration applying device to perform the first vibration applying operation for applying a vibration having the first vibration pattern to the target portion when the index value satisfies the first condition, and causes the vibration applying device to perform the second vibration applying operation for applying a vibration having the second vibration pattern different from the first vibration pattern to the target portion when the index value satisfies the second condition. With such a configuration, the operator can perceive the deviation of the actual state of the construction machine with respect to the operation target by the vibration having the first vibration pattern and the vibration having the second vibration pattern which differ from each other. Specifically, in the construction machine, the operator can perceive not only whether the deviation indicates the first situation corresponding to the first condition or the second situation corresponding to the second condition, but also a state that the situation of the construction machine is changed from the first situation to the second situation, and a state that the situation of the construction machine is changed from the second situation to the first situation. With such a configuration, it is possible to appropriately notify the operator of various changes in situations of the construction machine. As described above, in the construction machine, the deviation of the actual state of the construction machine with respect to the operation target is transmitted to the operator through the above-mentioned vibration and hence, it is unnecessary to transmit the state of the construction machine to the operator through the display device, a sound generation device or the like and, further, it is also unnecessary to transmit a state of the construction machine to the operator by applying an assist force to the operation lever. Accordingly, in the construction machine, when the deviation of the actual state of the construction machine with respect to the operation target is transmitted to the operator, it is possible to teach the operation to the operator with certainty thus enhancing the operability of the construction machine while decreasing cumbersomeness in operation of the operation lever without interrupting a line of sight of the operator or without making it difficult for the operator to hear a teaching sound.

[2] It is preferable that the construction machine further include: an external environment state detection part which detects an external environment state which is a state around the construction machine; and a target generation part which generates the operation target based on information including the external environment state detected by the external environment state detection part.

In this mode, the operation target is generated based on the information including the external environment state detected by the external environment state detection part and hence, even when the external environment state changes, the operation target is generated by taking into account a changed external environment state. With such a configuration, it is possible to transmit the deviation of an actual state of the construction machine to the operator based on the operation target corresponding to the changed external environment state. Accordingly, even when the external environment state changes, it is possible to teach the operator the operation with certainty thus enhancing the operability of the construction machine.

[3] In the construction machine, it is preferable that the operation target include a target track which is a target of a track drawn by the specific portion when the specific portion moves toward the target position, the index value includes a distance index value which is a distance between the specific portion and the target track, the first condition includes a condition that the distance index value is within a predetermined first distance range, and the second condition includes a condition that the distance index value is within a predetermined second distance range different from the first distance range.

In this mode, the vibration having the first vibration pattern or the vibration having the second vibration pattern is applied to the target portion corresponding to a magnitude of the distance index value which is a distance of the specific portion with respect to the target track. With such a configuration, the operator can perceive a distance from the specific portion to the target track by the vibration and hence, the specific portion can be guided to the target position through a track close to the target track.

[4] In the construction machine, it is preferable that, with respect to at least one of the first vibration pattern and the second vibration pattern, the smaller a distance between the target position and the specific portion, the larger a frequency of the vibration becomes or the larger an amplitude of the vibration becomes.

In this mode, as the distance from the specific portion to the target position decreases, the frequency or the amplitude of vibration of by the vibration applying device increases and hence, the operator can perceive a change in the distance through the change in frequency or the change in amplitude.

[5] The construction machine may further include a target generation part which generates the operation target, the operation target may include a deceleration target timing which is a target of a timing at which the upper slewing body starts the deceleration operation in response to a slewing deceleration command operation given to the operation part, the slewing deceleration command operation being a operation for stopping the slewing operation of the upper slewing body, and the target generation part may calculate an estimated required time from a point of time at which it is assumed that the operation part receives the slewing deceleration command operation until the slewing operation is stopped, and may calculate the deceleration target timing based on information including at least the estimated required time.

In this mode, the target generation part calculates the estimated required time, and calculates the deceleration target timing based on information including the estimated required time. The information relating to the deceleration target timing calculated as described above may be transmitted to the operator by a vibration applied by the vibration applying device at a point of time corresponding to the deceleration target timing, or may be transmitted to the operator by the vibration applied by the vibration applying device at a point of time before the deceleration target timing. The operator can perceive the deceleration target timing based on the information relating to the deceleration target timing transmitted by the vibration. With such a configuration, the specific portion can be easily stopped at the target position or in the vicinity of the target position.

Specifically, for example, in a case where the upper slewing body is rotatably driven by a hydraulic actuator (hydraulic motor), the estimated required time is calculated based on the kinetic energy calculated based on the moment of inertia of the upper slewing body, a slewing speed of the upper slewing body and the like, and the brake characteristic which the hydraulic circuit in the construction machine includes. The moment of inertia is determined corresponding to a position and a posture of the working device, a position and a posture of the attachment, a weight of a load loaded on the attachment and the like.

[6] In the construction machine, it is preferable that the index value include a time index value which serves as an index of a time difference with the deceleration target timing and indicates a current point of time which is a point of time at which the time index value is calculated, the first condition include a condition that the time index value is within a predetermined first time range before the deceleration target timing, and the second condition include a condition that the time index value is within a predetermined second time range before the deceleration target timing and close to the deceleration target timing compared to the first time range.

In this mode, the index value includes the time index value which serves as an index indicating a time difference between the deceleration target timing and a point of time (current point of time) corresponding to an actual state of the construction machine. In a case where the time index value is within the first time range, the vibration having the first vibration pattern is applied to the target portion by the vibration applying device, and in a case where the time index value is within the second time range, the vibration having the second vibration pattern is applied to the target portion by the vibration applying device. Accordingly, the operator can perceive in a stepwise manner that the time index value is approaching the deceleration target timing before the time index value reaches the deceleration target timing by the vibration having the first vibration pattern and the vibration having the second vibration pattern. With such a configuration, the specific portion can be more easily stopped at the target position or in the vicinity of the target position.

[7] The construction machine may further include a target generation part which generates the operation target, the operation target may include a deceleration target slewing amount which is a target of a slewing amount at which the upper slewing body starts a deceleration operation in response to a slewing deceleration command operation given to the operation part, the slewing deceleration command operation being a operation for stopping a slewing operation of the upper slewing body, and the target generation part may calculate an estimated required slewing amount from a point of time at which it is assumed that the operation part receives the slewing deceleration command operation until the slewing operation is stopped, and may calculate the deceleration target slewing amount based on information including a stopping target slewing amount corresponding to the target position and the estimated required sewing amount.

In this mode, the target generation part calculates the estimated required slowing amount, and calculates the deceleration target slowing amount based on the information including the stopping target slewing amount and the estimated required stewing amount. The information relating to the deceleration target slewing amount calculated as described above may be transmitted to the operator through a vibration applied by the vibration applying device at a point of time that a slewing amount of the upper stewing body reaches the deceleration target slewing amount, or may be transmitted to the operator by the vibration applied by the vibration applying device at a point of time before the slowing amount of the upper slewing body reaches the deceleration target slewing amount. The operator can perceive the deceleration target slewing amount based on the information relating to the deceleration target slewing amount transmitted by the vibration. With such a configuration, the specific portion can be easily stopped at the target position or in the vicinity of the target position.

Specifically, for example, in a case where the upper slewing body is rotatably driven by a hydraulic actuator, the estimated required slowing amount is calculated based on the kinetic energy at the time of slewing the upper slewing body and the brake characteristic which the hydraulic circuit in the construction machine includes.

[8] In the construction machine, it is preferable that the index value includes a slewing index value indicating a slewing amount of the upper slewing body at a point of time that the index value is calculated, the first condition includes a condition that the slewing index value is within a predetermined first slewing amount range before the slewing index value reaches the deceleration target slewing amount, and the second condition includes a condition that the slowing index value is within a predetermined second stewing amount range which is close to the deceleration target slowing amount compared to the first slewing amount range before the slewing index value reaches the deceleration target slewing amount.

In this mode, the index value includes the slewing index value that becomes an index of a difference between the deceleration target slewing amount and an actual slewing amount of the upper stewing body. In a case where the slewing index value is within the first slewing amount range, the vibration having the first vibration pattern is applied to the target portion by the vibration applying device, and in a case where the stewing index value is within the second slewing amount range, the vibration having the second vibration pattern is applied to the target portion by the vibration applying device. Accordingly, the operator can perceive in a stepwise manner that a slewing amount of the upper slewing body is approaching the deceleration target slewing amount before the slewing amount of the upper slewing body reaches the deceleration target slowing amount by the vibration having the first vibration pattern and the vibration having the second vibration pattern. With such a configuration, the specific portion can be more easily stopped at the target position or in the vicinity of the target position.

[9] In the construction machine, the second vibration pattern is preferably set such that a frequency of the vibration is more increased or an amplitude of the vibration is more increased compared to the first vibration pattern, for example.

In this embodiment, a frequency of vibration or an amplitude of vibration by the vibration applying device is more increased in a case where the time index value is within the second time range which is closer to the deceleration target timing than the first time range compared to a case where the time index value is within the first time range. With such a configuration, an operator can perceive in a stepwise manner that the deceleration target timing is approaching by a change in frequency or amplitude of vibration, and the specific portion can be more easily stopped at the target position or in the vicinity of the target position.

[10] In the construction machine, the operation target may include a target posture which is a target of a posture of the specific portion at the target position, the index value may include a posture index value which serves as an index indicating a deviation between the target posture and an actual posture of the specific portion, the first condition may include a condition that the posture index value is within a predetermined first posture range, and the second condition may include a condition that the posture index value is within a predetermined second posture range different from the first posture range.

In this mode, the vibration having the first vibration pattern or the vibration having the second vibration pattern is applied to the target portion corresponding to a magnitude of the deviation between the target posture and the actual posture of the specific portion. With such a configuration, the operator can perceive a magnitude of the deviation of a posture of the specific portion with respect to the target posture by the vibration and hence, the posture of the specific portion can be guided to the target posture.

[11] In the construction machine, it is preferable that the vibration applying device is provided to a grip of the operation part.

In this mode, the vibration applying device is provided to the grip of the operation part and hence, the operator can perceive the vibration by the vibration applying device through the grip of the operation part which the operator grasps with his/her hand with certainty and hence, it is possible to teach the operator an operation without interrupting a line of sight of the operator and without imparting the cumbersomeness to the operator.

[12] In the construction machine, it is preferable that the vibration applying device is detachably mounted on an operation lever of the operation part.

In this mode, the vibration applying device can be optionally mounted on the operation lever of the operation part of the construction machine on which the vibration applying device is not mounted in the standard specification.

[13] In the construction machine, it is preferable that the target portion includes an armrest, and the vibration applying device vibrates the armrest by being provided to the armrest.

In this mode, the vibration generated by the vibration applying device provided to the armrest is transmitted to the operator via the armrest on which the operator's arm is placed. Accordingly, the operator can perceive the deviation of an actual state of the construction machine with respect to the operation target by the vibration applied to the armrest.

[14] In the construction machine, it is preferable that at least one of the first condition, the second condition, the first vibration pattern, and the second vibration pattern is changeable or adjustable.

In this mode, the operator can more easily perceive the vibration by changing or adjusting the condition and the vibration pattern such that the operator can easily perceive the vibration.

The invention claimed is:

1. A construction machine comprising:
- a lower traveling body;
- an upper slewing body mounted on the lower traveling body so as to be slewable;
- a working device rotatably connected to the upper slewing body;
- an attachment connected to a distal end of the working device;
- an operation part which receives an operation by an operator for operating at least one of the lower traveling body, the upper slewing body, the working device, and the attachment;
- a vibration applying device which applies a vibration to a target portion that is at least a part of a portion which is brought into contact with a body of the operator who operates the operation part;
- a storage part which stores an operation target set as a target of an operation of the construction machine for moving a specific portion of the construction machine to a target position set as a destination to which the specific portion of the construction machine moves;
- a calculation part which calculates an index value which serves as an index indicating a deviation between the operation target and an actual state of the construction machine; and
- a control device which controls an operation of the vibration applying device, wherein
- the vibration applying device is configured to perform a first vibration applying operation for applying a vibration having a first vibration pattern to the target portion, and a second vibration applying operation for applying a vibration having a second vibration pattern different from the first vibration pattern to the target portion,
- the control device is configured to cause the vibration applying device to perform the first vibration applying operation when the index value calculated by the calculation part satisfies a predetermined first condition, and to cause the vibration applying device to perform the second vibration applying operation when the index value calculated by the calculation part satisfies a predetermined second condition different from the first condition,
- the specific portion is a distal end portion of the attachment,
- the operation target includes a target track which is a target of a track drawn by the specific portion when the specific portion moves toward the target position,
- the index value includes a distance index value which is a distance between the specific portion and the target track,
- the first condition includes a condition that the distance index value is within a predetermined first distance range, and
- the second condition includes a condition that the distance index value is within a predetermined second distance range different from the first distance range.

2. The construction machine according to claim 1, further comprising:
- an external environment state detection part which detects an external environment state which is a state around the construction machine; and a target generation part which generates the operation target based on information including the external environment state detected by the external environment state detection part.

3. The construction machine according to claim 1, wherein, with respect to at least one of the first vibration pattern and the second vibration pattern, the smaller a distance between the target position and the specific portion, the larger a frequency of the vibration becomes or the larger an amplitude of the vibration becomes.

4. The construction machine according to claim 1, wherein the operation target includes a target posture which is a target of a posture of the specific portion at the target position, the index value includes a posture index value which serves an index indicating a deviation between the target posture and an actual posture of the specific portion, the first condition includes a condition that the posture index value is within a predetermined first posture range, and the second condition includes a condition that the posture index value is within a predetermined second posture range different from the first posture range.

5. The construction machine according to claim 1, wherein the vibration applying device is provided to a grip of the operation part.

6. The construction machine according to claim 1, wherein the vibration applying device is detachably mounted on an operation lever of the operation part.

7. The construction machine according to claim 1, wherein the target portion includes an armrest, and the vibration applying device vibrates the armrest by being provided to the armrest.

8. The construction machine according to claim 1, wherein at least one of the first condition, the second condition, the first vibration pattern, and the second vibration pattern is changeable or adjustable.

9. The construction machine according to claim 1, wherein the target track is drawn by the specific portion when the specific portion moves from a position upwardly away from a ground toward the target position on the ground.

10. The construction machine according to claim 1, wherein the construction machine further comprises:

an external environment state detection part which detects an external environment state which is a state around the construction machine; and a target generation part which generates the operation target based on information including the external environment state detected by the external environment state detection part, wherein after generating the target track included in the operation target, the target generation part is configured to correct the target track such that the working device and the attachment avoid an obstacle without being brought into contact with the obstacle when the specific portion moves to the target position, based on information relating to the obstacle detected by the external environment state detection part.

11. A construction machine, comprising:

a lower traveling body;

an upper slewing body mounted on the lower traveling body so as to be slewable;

a working device rotatably connected to the upper slewing body;

an attachment connected to a distal end of the working device;

an operation part which receives an operation by an operator for operating at least one of the lower traveling body, the upper slewing body, the working device, and the attachment;

a vibration applying device which applies a vibration to a target portion that is at least a part of a portion which is brought into contact with a body of the operator who operates the operation part;

a storage part which stores an operation target set as a target of an operation of the construction machine for moving a specific portion of the construction machine to a target position set as a destination to which the specific portion of the construction machine moves;

a calculation part which calculates an index value which serves as an index indicating a deviation between the operation target and an actual state of the construction machine;

a control device which controls an operation of the vibration applying device; and a target generation part which generates the operation target, wherein the vibration applying device is configured to perform a first vibration applying operation for applying a vibration having a first vibration pattern to the target portion, and a second vibration applying operation for applying a vibration having a second vibration pattern different from the first vibration pattern to the target portion, the control device is configured to cause the vibration applying device to perform the first vibration applying operation when the index value calculated by the calculation part satisfies a predetermined first condition, and to cause the vibration applying device to perform the second vibration applying operation when the index value calculated by the calculation part satisfies a predetermined second condition different from the first condition, the operation target includes a deceleration target timing which is a target of a timing at which the upper slewing body starts a deceleration operation in response to a slewing deceleration command operation given to the operation part, the slewing deceleration command operation being an operation for stopping a slewing operation of the upper slewing body, and the target generation part calculates an estimated required time from a point of time at which it is assumed that the operation part receives the slewing deceleration command operation until the slewing operation is stopped, and calculates the deceleration target timing based on information including at least the estimated required time.

12. The construction machine according to claim 11, wherein the index value includes a time index value which serves as an index of a time difference with the deceleration target timing and indicates a current point of time which is a point of time at which the time index value is calculated, the first condition includes a condition that the time index value is within a predetermined first time range before the deceleration target timing, and the second condition includes a condition that the time index value is within a predetermined second time range before the deceleration target timing and close to the deceleration target timing compared to the first time range.

13. The construction machine according to claim 12, wherein the second vibration pattern is set such that a frequency of the vibration is more increased or an amplitude of the vibration is more increased compared to the first vibration pattern.

14. A construction machine, comprising:

a lower traveling body;

an upper slewing body mounted on the lower traveling body so as to be slewable;

a working device rotatably connected to the upper slewing body;

an attachment connected to a distal end of the working device;

an operation part which receives an operation by an operator for operating at least one of the lower traveling-body, the upper slewing-body, the working device, and the attachment;

a vibration applying device which applies a vibration to a target portion that is at least a part of a portion which is brought into contact with a body of the operator who operates the operation part;

a storage part which stores an operation target set as a target of an operation of the construction machine for moving a specific portion of the construction machine to a target position set as a destination to which the specific portion of the construction machine moves;

a calculation part which calculates an index value which serves as an index indicating a deviation between the operation target and an actual state of the construction machine;

a control device which controls an operation of the vibration applying device; and a target generation part which generates the operation target, wherein the vibration applying device is configured to perform a first vibration applying operation for applying a vibration having a first vibration pattern to the target portion, and a second vibration applying operation for applying a vibration having a second vibration pattern different from the first vibration pattern to the target portion, the control device is configured to cause the vibration applying device to perform the first vibration applying operation when the index value calculated by the calculation part satisfies a predetermined first condition, and to cause the vibration applying device to perform the second vibration applying operation when the index value calculated by the calculation part satisfies a predetermined second condition different from the first condition, the operation target includes a deceleration target slewing amount which is a target of a slewing amount at which the upper slewing body starts a deceleration operation in response to a slewing deceleration command operation given to the operation part, the slewing deceleration command operation being an operation for stopping a slewing operation of the upper slewing body, and the target generation part calculates an estimated required slewing amount from a point of time at which it is assumed that the operation part receives the slewing deceleration command operation until the slewing operation is stopped, and calculates the deceleration target slewing amount based on information including a stopping target slewing amount corresponding to the target position and the estimated required slewing amount.

15. The construction machine according to claim 14, wherein the index value includes a slewing index value indicating a slewing amount of the upper slewing body at a point of time that the index value is calculated, the first condition includes a condition that the slewing index value is within a predetermined first slewing amount range before the slewing index value reaches the deceleration target slewing amount, and the second condition includes a condition that the slewing index value is within a predetermined second slewing amount range which is close to the deceleration target slewing amount compared to the first slewing amount range before the slewing index value reaches the deceleration target slewing amount.

* * * * *